(12) United States Patent
Koguchi et al.

(10) Patent No.: US 7,974,529 B2
(45) Date of Patent: Jul. 5, 2011

(54) DIGITAL CAMERA

(75) Inventors: Takehiro Koguchi, Saitama (JP); Toru Ueda, Saitama (JP); Makoto Okada, Tokyo (JP); Mitsuru Kamijo, Tokyo (JP); Yuuki Okabe, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 12/688,350

(22) Filed: Jan. 15, 2010

(65) Prior Publication Data
US 2010/0110279 A1 May 6, 2010

Related U.S. Application Data

(62) Division of application No. 11/704,328, filed on Feb. 9, 2007, now Pat. No. 7,813,637.

(30) Foreign Application Priority Data

| Feb. 10, 2006 | (JP) | 2006-034560 |
| Feb. 24, 2006 | (JP) | 2006-049341 |
| Aug. 18, 2006 | (JP) | 2006-223400 |

(51) Int. Cl.
*G03B 15/03* (2006.01)
(52) U.S. Cl. .................................................... 396/166
(58) Field of Classification Search ........... 396/166–170
See application file for complete search history.

(56) References Cited

U.S. PATENT DOCUMENTS

| 4,965,626 | A | * | 10/1990 | Robison et al. | 355/40 |
| 5,664,243 | A | * | 9/1997 | Okada et al. | 396/246 |
| 7,046,275 | B1 | * | 5/2006 | Yamada et al. | 348/220.1 |
| 7,813,637 | B2 | * | 10/2010 | Koguchi et al. | 396/166 |
| 2003/0223011 | A1 | * | 12/2003 | Miki | 348/371 |
| 2006/0215041 | A1 | * | 9/2006 | Kobayashi | 348/220.1 |
| 2008/0158387 | A1 | * | 7/2008 | Ejima et al. | 348/231.3 |

FOREIGN PATENT DOCUMENTS
JP 2005-284166 A 10/2005
* cited by examiner

*Primary Examiner* — W. B. Perkey
(74) *Attorney, Agent, or Firm* — Sughrue Mion, PLLC

(57) ABSTRACT

A digital camera is provided with a special successive shooting mode wherein an imaging device makes a series of successive shots upon each shutter release operation, including at least a non-flash shot and at least a flash shot. When a shutter button is pressed halfway in the successive shooting mode, an exposure condition deciding device decides an exposure condition common to the non-flash and flash shots, or individual exposure conditions for the non-flash shot and the flash shot. When the shutter button is fully pressed, the imaging device starts the successive shots of one series. Images captured by the non-flash shot and the flash shot are displayed on an LCD panel. Before the imaging device starts the successive shots, necessary warning marks are displayed together with the exposure conditions decided by the exposure condition deciding device.

29 Claims, 22 Drawing Sheets

DIGITAL CAMERA

This application is a divisional of U.S. Ser. No. 11/704,328, filed Feb. 9, 2007, which claims priority to JP 2006-034560, filed Feb. 10, 2006, JP 2006-049341, filed Feb. 24, 2006, and JP 2006-223400, filed Aug. 18, 2006, each of which is hereby incorporated by reference in its entirety.

FIELD OF THE INVENTION

The present invention relates to a digital camera that can shoot images of the same subject with flash and without flash in continuous succession upon a shutter release operation.

BACKGROUND OF THE INVENTION

There are a wide variety of digital cameras, including compact type, single-reflex type, and ones incorporated into electronic equipments, like a camera phone. According to the types, the digital cameras have various functions. For example, there are such single-reflex type digital cameras that have a function to perform successive shots in response to a shutter release operation, some of which can emit flash light synchronously with each shot, as disclosed for example in Japanese Laid-open Patent Application No. 2005-284166.

The above-mentioned prior art discloses a digital still camera and a method of controlling the successive shots, wherein the amount of flash light that is necessary for a proper exposure condition is calculated based on a subject distance, a stop aperture value and an imaging sensitivity of an imaging device. During the successive shots, it is checked if a flash device can emit the calculated necessary amount of flash light, considering how much voltage is charged in a main capacitor and other flashing conditions. So long as the flash device can emit the necessary amount of light, the camera performs flash shots. After it becomes impossible to emit the necessary amount of flash light, the camera continues shooting while adjusting the stop aperture value, the shutter speed and/or the imaging sensitivity so as to set a proper exposure condition under an available amount of light.

According to the prior art, however, the choice between flash shot and non-flash shot is made during the successive shots depending upon the voltage charged in the main capacitor and the like, and the user cannot make that choice. Besides, it is difficult to judge which is preferable for an individual scene using the flash light or not, unless the user checks the obtained images. Therefore, it is desirable to make both a flash shot and a non-flash shot to one scene, so that the user may compare them afterward.

SUMMARY OF THE INVENTION

In view of the foregoing, a primary object of the present invention is to provide a digital camera that can make a flash shot and a non-flash shot successively to one scene while setting proper exposure conditions, and allows comparison between images as obtained through the flash shot and the non-flash shot.

According to the present invention, in a digital camera that is provided with a special successive shooting mode wherein an imaging device makes a series of successive shots upon each shutter release operation, including at least a non-flash shot and at least a flash shot that is made synchronously with a flash light from a flash device, the digital camera comprises an exposure condition deciding device for deciding exposure condition of the imaging device through photometry and calculation, wherein the exposure condition deciding device decides a common exposure condition to the non-flash shot and the flash shot in the successive shooting mode.

The exposure condition deciding device may alternatively decide individual exposure conditions for the non-flash shot and the flash shot upon a shutter button being pressed halfway in the successive shooting mode, and the imaging device starts the successive shots of one series when the shutter button is fully pressed.

Preferably, the digital camera further comprises a light control device for controlling volume of the flash light from the flash device, the light control device being successively driven upon a predetermined operation or at predetermined timing while the imaging device is being driven successively in the successive shooting mode.

Preferably, the digital camera further comprises a device for changing imaging sensitivity of the imaging device when under-exposure will occur under the exposure condition decided based on the present sensitivity in the successive shooting mode.

When a plural number of flash shots are successively made upon one shutter release operation in the successive shooting mode, it is preferable to raise the imaging sensitivity and activate the light control device for these flash shots.

Preferably, the digital camera further comprises a judging device for judging whether to lower photometric sensitivity and imaging sensitivity when a measured subject brightness value is above a predetermined value, wherein when the judging device judges to lower the photometric sensitivity and imaging sensitivity, the exposure condition deciding device carries out the photometry and calculation at the lowered photometric and imaging sensitivities to decide the exposure conditions, and the imaging device makes the successive shots at the lowered imaging sensitivity.

Preferably, the digital camera further comprises a display device for displaying images based on image data obtained through the imaging device, wherein the display device displays images as captured by the successive shots of one series in the successive shooting mode.

Preferably, the digital camera further comprises a warning device for giving warning when it is judged to be necessary to warn about one or both of the non-flash shot and the flash shot in the successive shooting mode.

According to a preferred embodiment, the imaging device of the digital camera first makes tentative non-flash and flash shots at a low resolution, and thereafter makes the successive shots of one series at a higher resolution in the successive shooting mode. Thereby, it becomes possible to display preview images based on image data obtained by the tentative shots. It is preferable to display necessary warnings together with the corresponding preview images.

Where the digital camera comprises a light control device for controlling volume of the flash light from the flash device, the flash device emits a first light with a first volume at the tentative flash shot in the successive shooting mode, and the light control device calculates a second light volume based on a photometric value obtained through the tentative flash shot, so the flash device emits the flash light with the second light volume at the flash shot of the successive shots.

Based on data obtained through the tentative non-flash and flash shot, the exposure condition deciding device preferably decides the exposure conditions for the non-flash shot and the flash shot of the successive shots of one series.

BRIEF DESCRIPTION OF THE DRAWINGS

The above and other objects and advantages of the present invention will be more apparent from the following detailed description of the preferred embodiments when read in connection with the accompanied drawings, wherein like reference numerals designate like or corresponding parts throughout the several views, and wherein.

DESCRIPTION OF THE PREFERRED EMBODIMENTS

Figure 1:
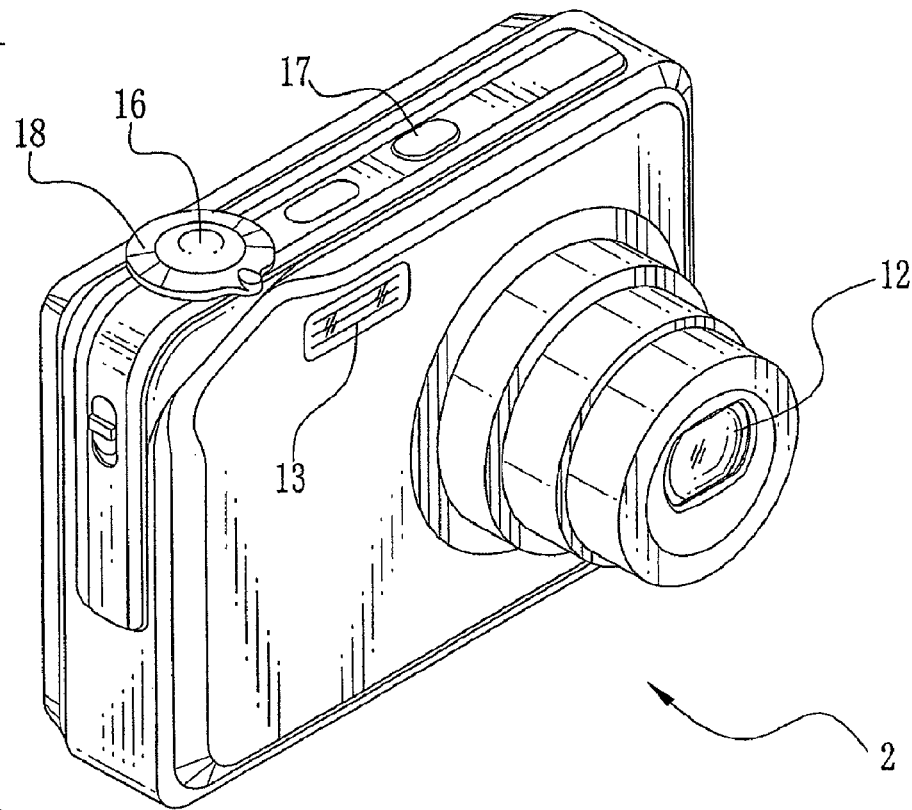
FIG. 1 is a front perspective view of a digital camera embodying the present invention.
Figure 2:
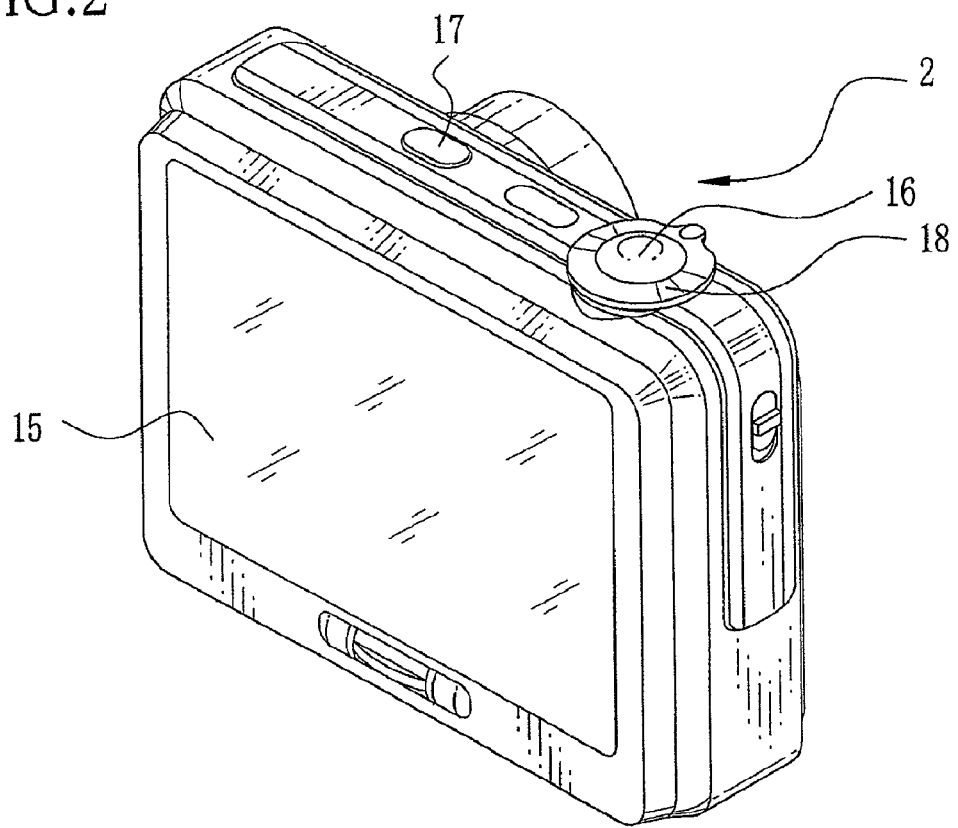
FIG. 2 is a rear perspective view of the digital camera.
Figure 3:
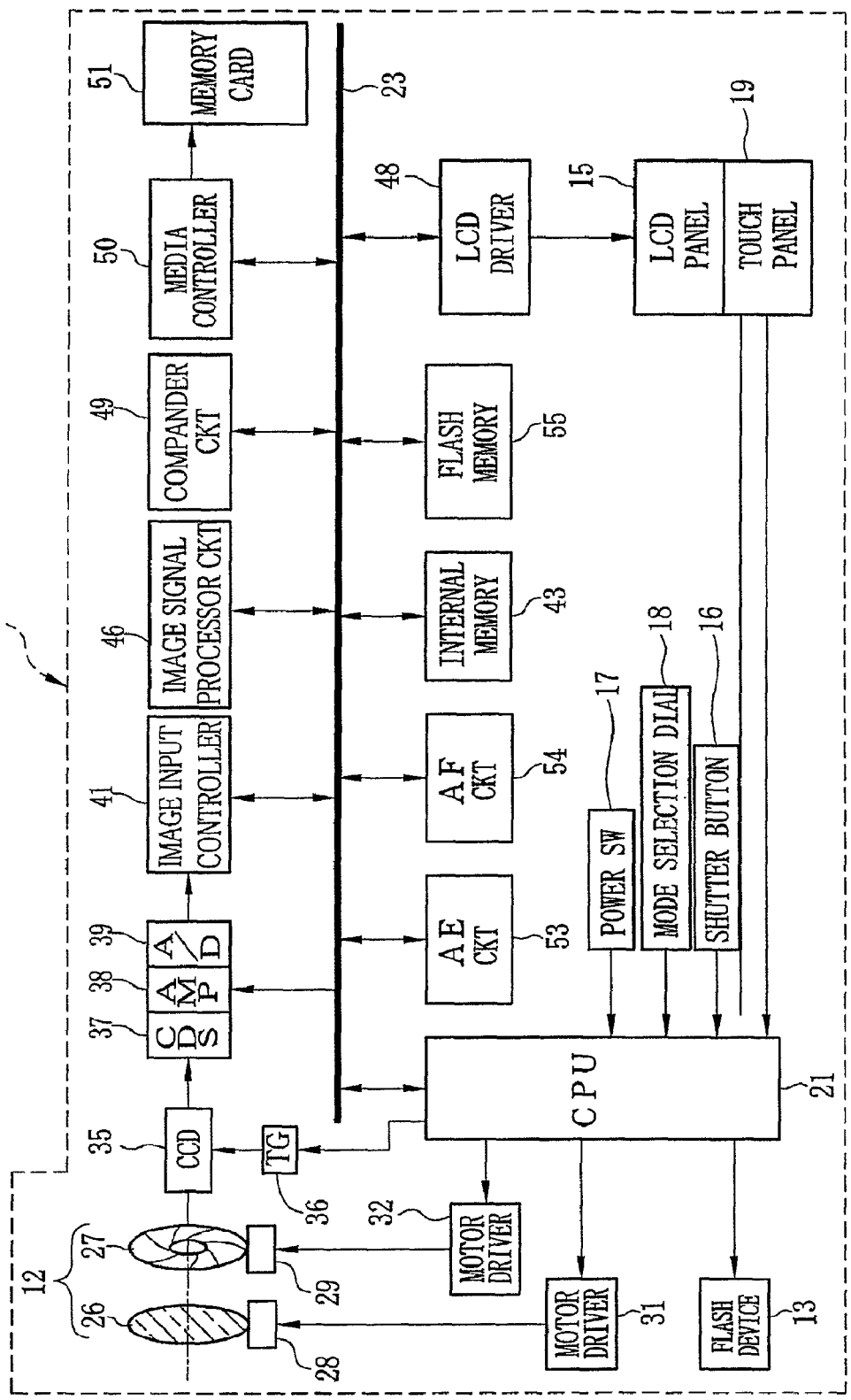
FIG. 3 is a block diagram illustrating a schematic structure of the digital camera.

FIGS. 1 and 2 show an outer appearance of a digital camera 10 embodying the present invention. The digital camera 10 has a substantially parallelepiped camera body 11 that is provided with a taking lens 12 and a flash device 13 on its front. On a rear side of the camera body 11 is mounted an LCD panel 15 as an image display device. As will be described with reference to FIG. 3, a touch panel 19 is mounted on an obverse surface of the LCD panel 15. The camera body 11 has on its top a release button 16, a power switch 17, and a mode selection dial 18. According to the present embodiment, a user can press the release button 16 into a half-pressed position and then to a full-pressed position. Although it is not shown in the drawings, a memory card slot is provided in a bottom of the camera body 11, for detachably attaching a memory card 51 (see FIG. 3) to the digital camera 10, so that the memory card 51 stores image data captured by the digital camera 10.

Responsive to an operation on the mode selection dial 18, the digital camera 10 is switched over between a standard shooting mode, a successive shooting mode, a reproduction mode for displaying captured images on the LCD panel 15, and other modes. After the mode selection, the digital camera 10 is operated through the touch panel 19, except the operation on the shutter button 16 and the power switch 17.

In synchronism with a shutter release operation that is executed when the shutter button 16 is fully pressed, the flash device 13 emits a flash of light toward a subject, to make a flash shot. The amount of flash light is decided depending upon a subject distance, an imaging sensitivity and a stop aperture value, so as to make a proper exposure amount. In the standard shooting mode, the flash device 13 automatically emits light to a subject whose brightness is less than a predetermined level, but does not automatically emit light to a subject whose brightness is above the predetermined level. The user can also decide whether to emit the flash light or not in the standard shooting mode, regardless of the subject brightness.

When the successive shooting mode is selected, a series of shots are made in continuous succession upon the shutter button 16 being fully pressed down. In the present invention, the successive shooting mode means a specific successive shooting mode wherein at least a non-flash shot, i.e. a shot without the flash light, and at least a flash shot with the flash light, are made upon each shutter release operation. In a first embodiment of the invention, the digital camera 10 first makes a non-flash shot and next a flash shot upon each shutter release operation, as set forth in detail later Referring to FIG. 3, a CPU 21 controls respective components of the digital camera 10 through an I/O bus 23, in response to various operational signals entered through the shutter button 16, the power switch 17 and the touch panel 19.

The taking lens 12 is a zoom lens system consisting of lens elements 26 and a stop 27. The lens elements 26 are driven by a lens drive mechanism 28 including a stepping motor, to adjust the optical zoom rate and the focal point of the zoom lens 12.

The stop 27 is driven by a stop drive mechanism 29 including a stepping motor, to change the aperture value of the stop 27 stepwise. For example, where the stop 27 has an f-number of F/2.8 at the open aperture, and an f-number of F/11 at the minimum aperture, the stop 27 is set at one of F/2.8, F/4, F/5.6, F/8 and F/11, which correspond to aperture values of 3.0, 4.0, 5.0, 6.0 and 7.0, respectively. The lens drive mechanism 28 and the stop drive mechanism 29 are respectively driven by motor drivers 31 and 32 under the control of the CPU 21.

A solid state imaging device, e.g. a CCD 35, is placed behind the taking lens 12. The CCD 35 is connected to the CPU 21 via a timing generator (TG) 36. In the shooting modes, the CPU 21 controls the timing generator 36 to generate a timing signal consisting of clock pulses, so the CCD 35 is driven by the timing signal.

An optical image is formed through the taking lens 12 on a light receiving surface of the CCD 35, so the CCD 35 converts the optical image into an analog image signal. The image signal is sent from the CCD 35 to a correlated double sampling (CDS) circuit 37, which outputs image signal of three primary colors (R, G, B) in correspondence with respective amounts of electrostatic charges in individual cells of the CCD 35. The analog three color image signals output from the CDS circuit 37 are amplified by an amplifier (AMP) 38, and are converted through an A/D converter 39 into digital image data.

The image data is output from the A/D converter 39 to an image input controller 41. The image input controller 41 is connected to the CPU 21 via the I/O bus 23, and the I/O bus 23 is connected to an internal memory 43, e.g. a synchronous dynamic random access memory (SDRAM). So the CPU 21 controls the image input controller 41 to write the image data in the internal memory 43. The image data, as stored in the internal memory 43, is processed by an image signal processor circuit 46 for gradation conversion, white-balance correction, gamma correction and the like.

In the shooting modes, the CCD 35 carries out an imaging process at a given frame rate, and the obtained image data is processed as above. Based on the processed image data, live image of the subject, or may be called camera-through image, is displayed on the LCD panel 15. The LCD panel 15 is driven by an LCD driver 48. The LCD driver 48 is provided with an image memory and a D/A converter, to store the processed image data temporarily in the image memory and then converts the image data through the D/A converter into an analog signal, e.g. NTSC signal. Then the LCD driver 48 outputs the NTSC signal to the LCD panel 15.

When the shutter release operation is made by pressing the shutter button 16 to the full, the CCD 35 captures true image data of bigger pixel numbers than the image data for the live image. The true image data is processed in the same way as set forth above, and then compressed according to a predetermined compression format, e.g. JPEG-format, through a compander circuit 49. A media controller 50 writes the compressed true image data in the memory card 51.

Besides the media controller 50, the compander circuit 49, the LCD driver 48 and the image signal processor circuit 46, an automatic exposure control (AE) circuit 53, an automatic focusing (AF) circuit 49 and a flash memory 55 are connected to the I/O bus 23. The AF circuit 54 extracts high frequency contrast data from the image data as being output from the image input controller 41, and sends the contrast data to the CPU 21. With reference to the contrast data, the CPU 21 controls the lens drive mechanism 28 through the motor driver 27, to move a focusing lens along an optical axis. The focusing lens is included in the lens elements 26, and stopped at a position where the contrast of the high frequency component of the subject image becomes the highest.

The AE circuit 53 integrates luminance signal of the image data, to detect an integrated luminance value as photometric data that is representative of a brightness value of the subject. The AE circuit 53 also detects what kind of light source is used at present, and sends the luminance value or subject brightness value and the information on the light source to the CPU 21. Based on the subject brightness value, the CPU 21 decides a proper exposure condition, as a combination of a stop aperture value, a shutter speed, and an imaging sensitivity. Then, the CPU 21 controls the stop drive mechanism 29 through the motor driver 32, to set the decided aperture value at the stop 27, and controls the timing generator 36 to generate such timing signal that activates the CCD 35 at the decided shutter speed. The CPU 21 also sets the decided imaging sensitivity at the CDS circuit 37 and the amplifier 38.

On setting the exposure condition, the CPU 21 decides the shutter speed, the stop aperture value and the imaging sensitivity based on the subject brightness, with reference to an automatic exposure control program that is previously stored in the flash memory 55. Note that the flash memory 55 is a well known non-volatile memory that stores various programs, various data and various parameters for use in controlling the operations.

Figure 4:
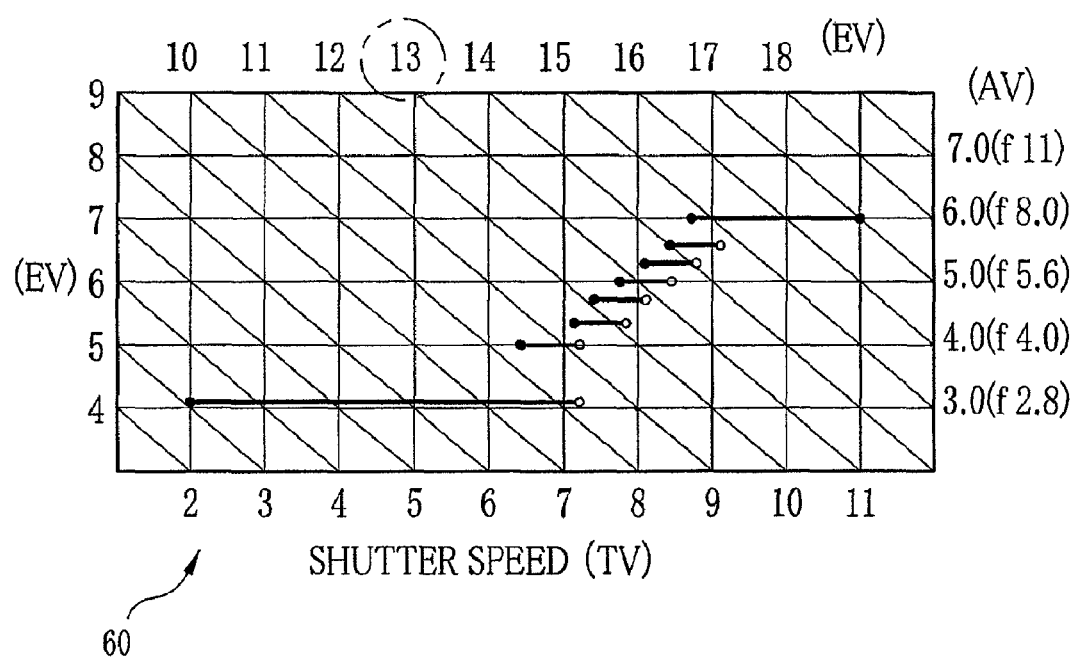
FIG. 4 is a diagram illustrating a program for automatic exposure control, according to a first embodiment of the present invention.

FIG. 4 shows an automatic exposure control program according to the first embodiment, wherein the same exposure condition that is decided based on the subject brightness is used for the non-flash shot and the flash shot in the successive shooting mode. In the first embodiment, the exposure condition is decided by the shutter speed and the aperture value, while the imaging sensitivity is maintained constant for the non-flash shot and the flash shot as well.

Figure 5:
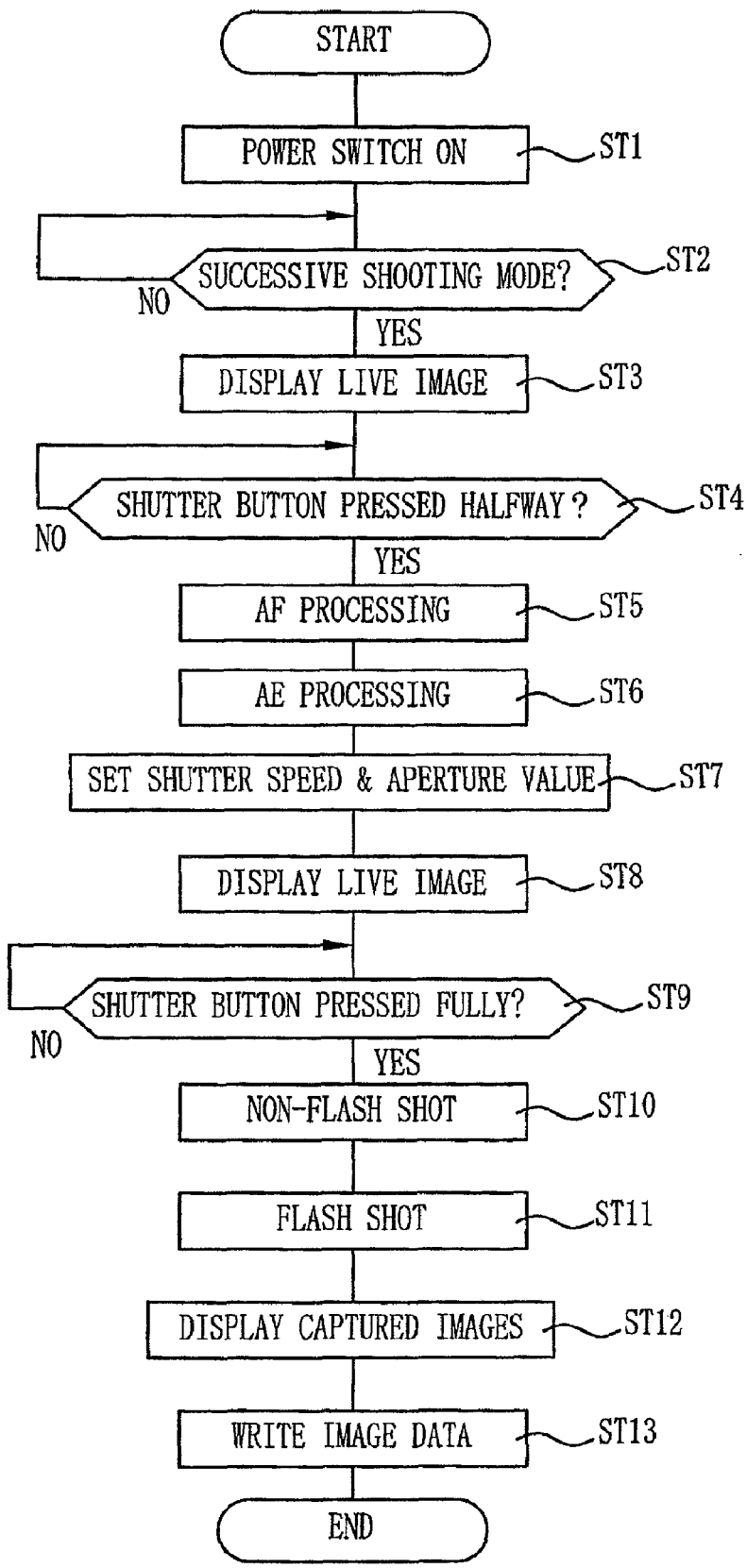
FIG. 5 is a flow chart illustrating a main sequence for operating the digital camera in a successive shooting mode, according to the first embodiment.

Now the operation of the digital camera 10 in the successive shooting mode of the first embodiment will be described with reference to the flow chart of FIG. 5.

First, the power switch 17 is turned on (ST1: step 1), and the LCD panel 15 is operated to select the successive shooting mode (ST2: step 2). Then, the image data output from the image input controller 41 is sent to the LCD driver 48, to display the live image of the subject on the LCD panel 15 (ST3: step 3). Thus, the LCD panel 15 functions as an electronic viewfinder, so the user frames a scene while observing the live image on the LCD panel 15. When the user presses the shutter button 16 halfway or lightly (ST4: step 4), the AF circuit 54 executes an AF processing (ST5: step 5), and the AE circuit 53 executes an AE processing (ST6: step 6).

The AF circuit 54 extracts the high frequency contrast data from the image data, and sends the contrast data to the CPU 21. The CPU 21 controls the lens drive mechanism 28 through the motor driver 27, to move the lens elements 26 to a position where the contrast of the high frequency component of the subject image becomes the highest.

The AE circuit 53 integrates the luminance signal of the image data, and sends the integrated luminance value as a brightness value of the subject to the CPU 21. Based on the subject brightness value, the CPU 21 decides a proper exposure condition, as a combination of a stop aperture value and a shutter speed, according to the program 60. In the example shown in FIG. 4, the subject brightness value is 13 Ev, so the shutter speed is decided to be Tv8 (1/250 sec.), and the aperture value is decided to be Av5 (F/5.8). Then, the CPU 21 controls the stop drive mechanism 29 to set the decided aperture value at the stop 27, and controls the timing generator 36 to activate the CCD 35 at the decided shutter speed (ST7: step 7).

Figure 6A:
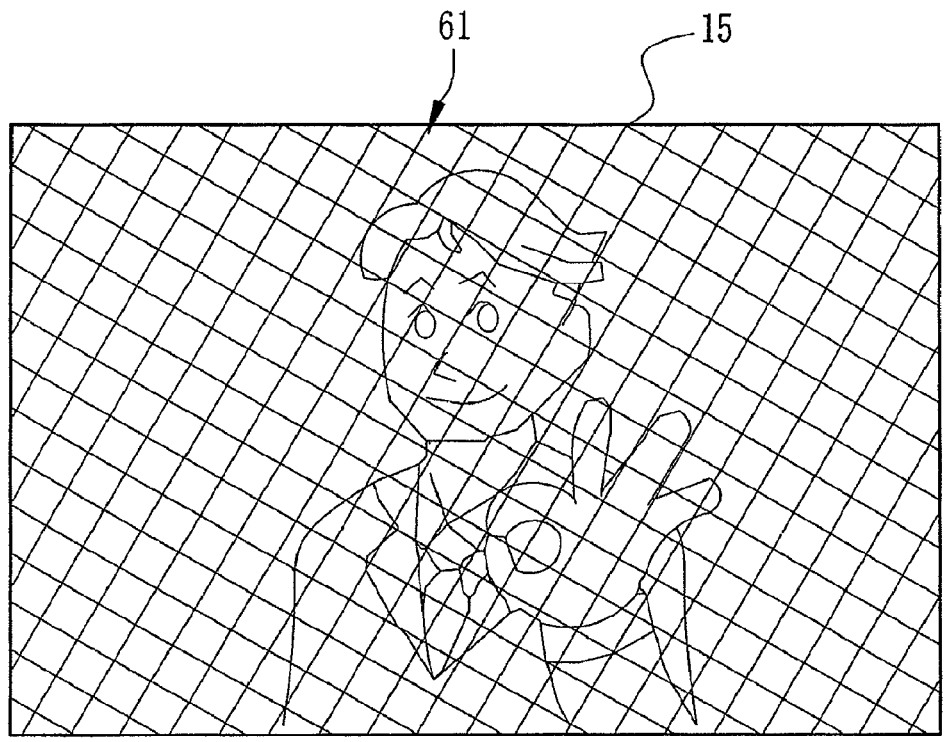
FIGS. 6A and 6B are explanatory diagrams illustrating an embodiment of a display screen for checking images captured in the successive shooting mode.
Figure 6B:
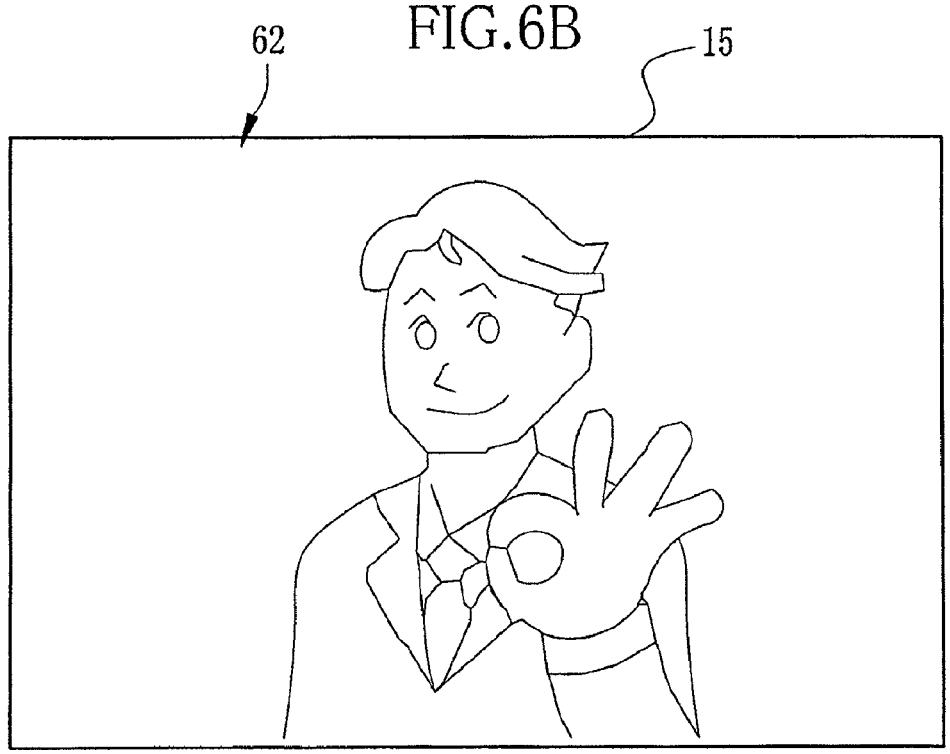

After confirming the live image on the LCD panel 15 (ST8: step 8), the user presses the shutter button 16 farther from the half-pressed position to the full-pressed position (ST9: step 9). The moment the shutter button 16 is pressed to the full, the non-flash shot is made first (ST10: step 10), and the imaging signal is read out from the CCD 35 in a charge accumulation time corresponding to the shutter speed set by the AE circuit 53. The imaging signal from the CCD 35 is fed through the CDS circuit 37, the amplifier 38 and the A/D converter 39 to the image input controller 41, so the image input controller 41 outputs image data. The image data obtained by the non-flash shot is temporarily stored in the internal memory 43. Next, the CPU 21 executes the flash shot by driving the flash device 13 to emit a predetermined amount of light synchronously with a second time of reading of the imaging signal from the CCD 35 in the charge accumulation time corresponding to the set shutter speed (ST11: step 11). Image data obtained by the flash shot is also stored temporarily in the internal memory 43, to complete the flash shot. Then, the CPU 21 reads out the image data as captured by the non-flash shot and the flash shot from the internal memory 43, to display post-view images on the LCD panel 15 based on the captured image data (ST12: step 12). In the present embodiment, the post-view images are displayed in the way as shown in FIGS. 6A and 6B. That is, the image 61 captured by the non-flash shot is displayed first, and the image 62 captured by the flash shot is displayed next. After displaying the captured images, the CPU 21 compresses the image data to reduce the data volume through the compander circuit 49, and writes the compressed image data in the memory card 51 through the media controller 50 (ST13: step 13). It is alternatively possible to write the image data in the memory card 51 while displaying the captured images. For example, the image data of the image 61 captured by the non-flash shot is written in the memory card 51 while the captured image 61 is displayed on the LCD panel 15, and when the writing of the image data of the image 61 is completed, the LCD panel 15 switches to display the image 62 captured by the flash shot. While the image 62 is displayed, the image data of the image 62 is written in the memory card 51. Completion of writing of the image data obtained by the non-flash and flash shots is the end of one successive shooting. Then, the CPU 21 resets the LCD panel 15 to display the live image. The user can make the successive shooting appropriate times by making the shutter release operations the appropriate times during the successive shooting mode.

Since the image data of the same subject is obtained by the non-flash shot and the flash shot in succession upon one shutter release operation, the user can compare the image captured by the non-flash shot to one captured by the flash shot, to choose a better one.

Figure 7:
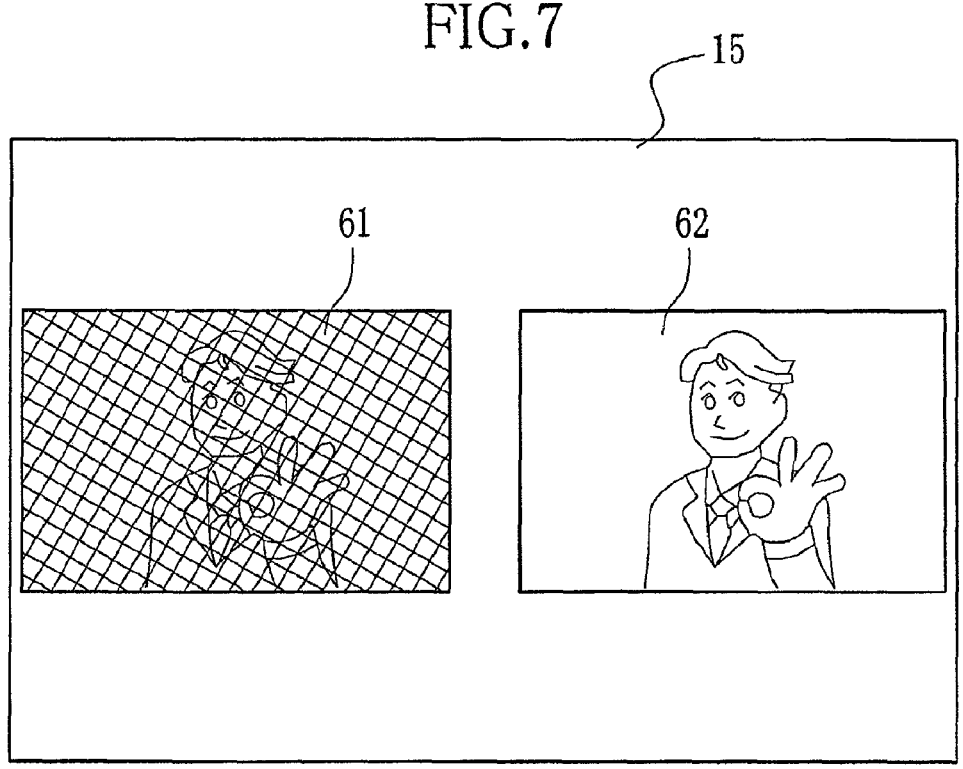
FIG. 7 is an explanatory diagram illustrating another embodiment of a display screen for checking images captured in the successive shooting mode.
Figure 8:
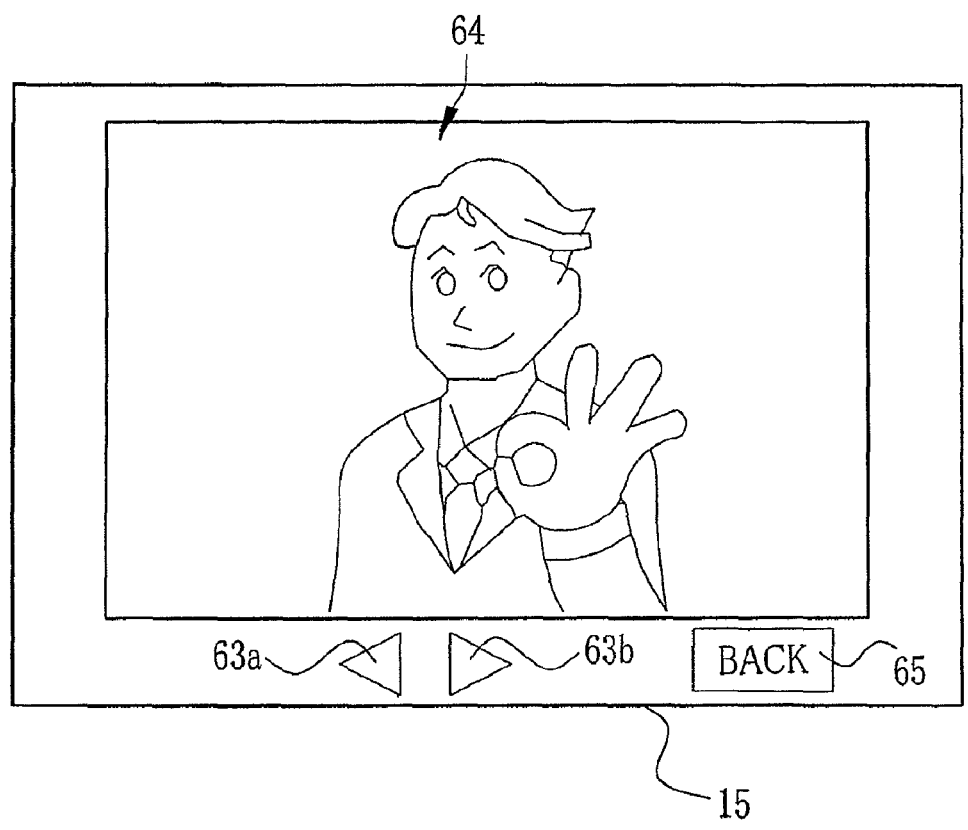
FIG. 8 is an explanatory diagram illustrating still another embodiment of a display screen for checking images captured in the successive shooting mode.

Although the post-view images 61 and 62 of the non-flash shot and the flash shot are displayed one after another at predetermined intervals in the first embodiment, it is possible to display both of the images 61 and 62 on the same screen of the LCD panel 15, as shown in FIG. 7, thereby to facilitate comparison between them. It is also possible to display switching buttons 63a and 63b on the LCD panel 15, to switch over between post-view images by operating the buttons 63a and 63b on the touch panel 19. Another kind of switching device is usable instead of the switching buttons 63a and 63b of the touch panel 19.

In the first embodiment, the post-view images obtained by the non-flash shot and the flash shot in the successive shooting mode are displayed before the image data of these images are written in the memory card 51. However, it is possible to display the post-view images after the image data of these images are written in the memory card 51. In that case, it is preferable to provide the touch panel 19 with such a button 65 that puts the screen back to the previous condition, for example, a standby condition preparing for the next shutter release operation, where the live image is displayed on the LCD panel 15. Alternatively, the screen may be set back to the previous condition automatically after the post-view images are displayed for a predetermined time.

In the first embodiment, the non-flash shot and the flash 10, shot are made at the same exposure condition decided through the AE processing upon the shutter button 16 being half-pressed in the successive shooting mode. But the present invention is not limited to this embodiment. In a second embodiment as set forth below, the non-flash shot and the flash shot are made at different exposure conditions from each other. A digital camera for the second embodiment may have the same structure described in the first embodiment, so the following description will use the same reference numerals as used in the first embodiment, and will refer to merely those features essential to the second embodiment.

Figure 9A:
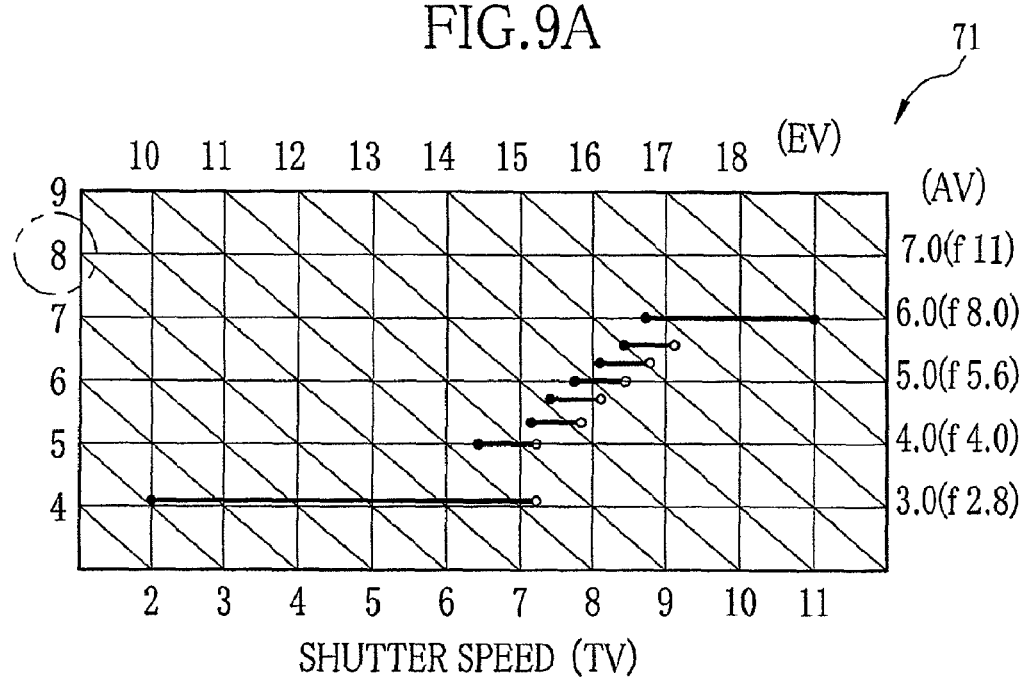
FIGS. 9A and 9B are diagrams illustrating programs for automatic exposure control for a non-flash shot and a flash shot, according to a second embodiment of the invention.
Figure 9B:
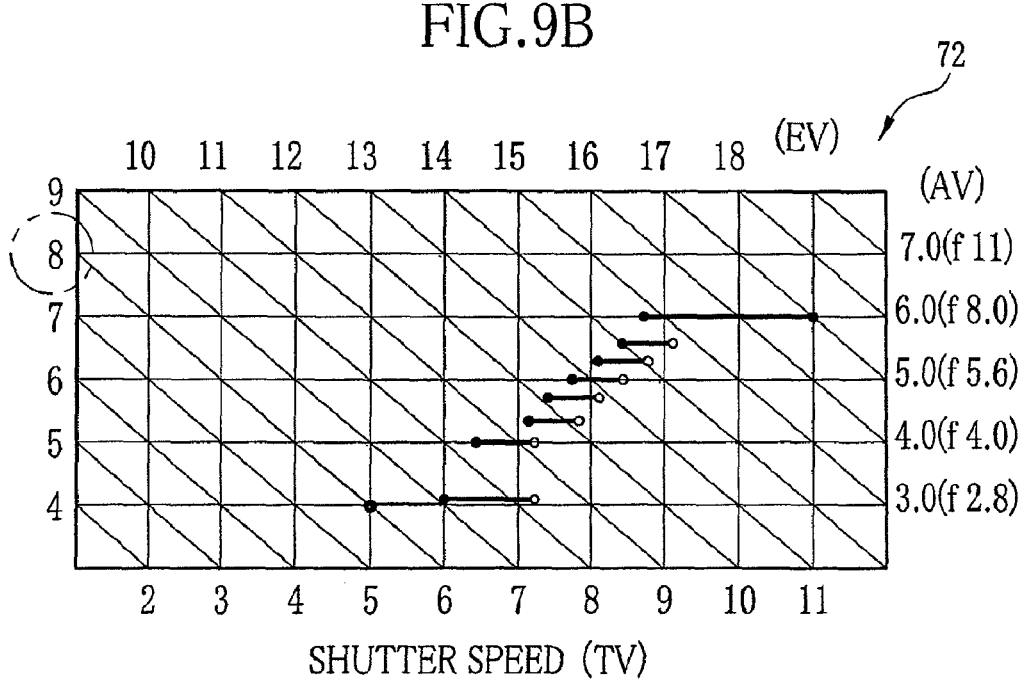

In the second embodiment, a flash memory 55 stores automatic exposure control programs 71 and 72, as shown in FIGS. 9A and 9B, for the non-flash shot and for the flash shot respectively. On the AZ processing in the successive shooting mode, a CPU 21 reads the programs 71 and 72, to decide proper exposure conditions for the non-flash shot and the flash shot based on a subject brightness value according to the programs 71 and 72, respectively.

Figure 10:
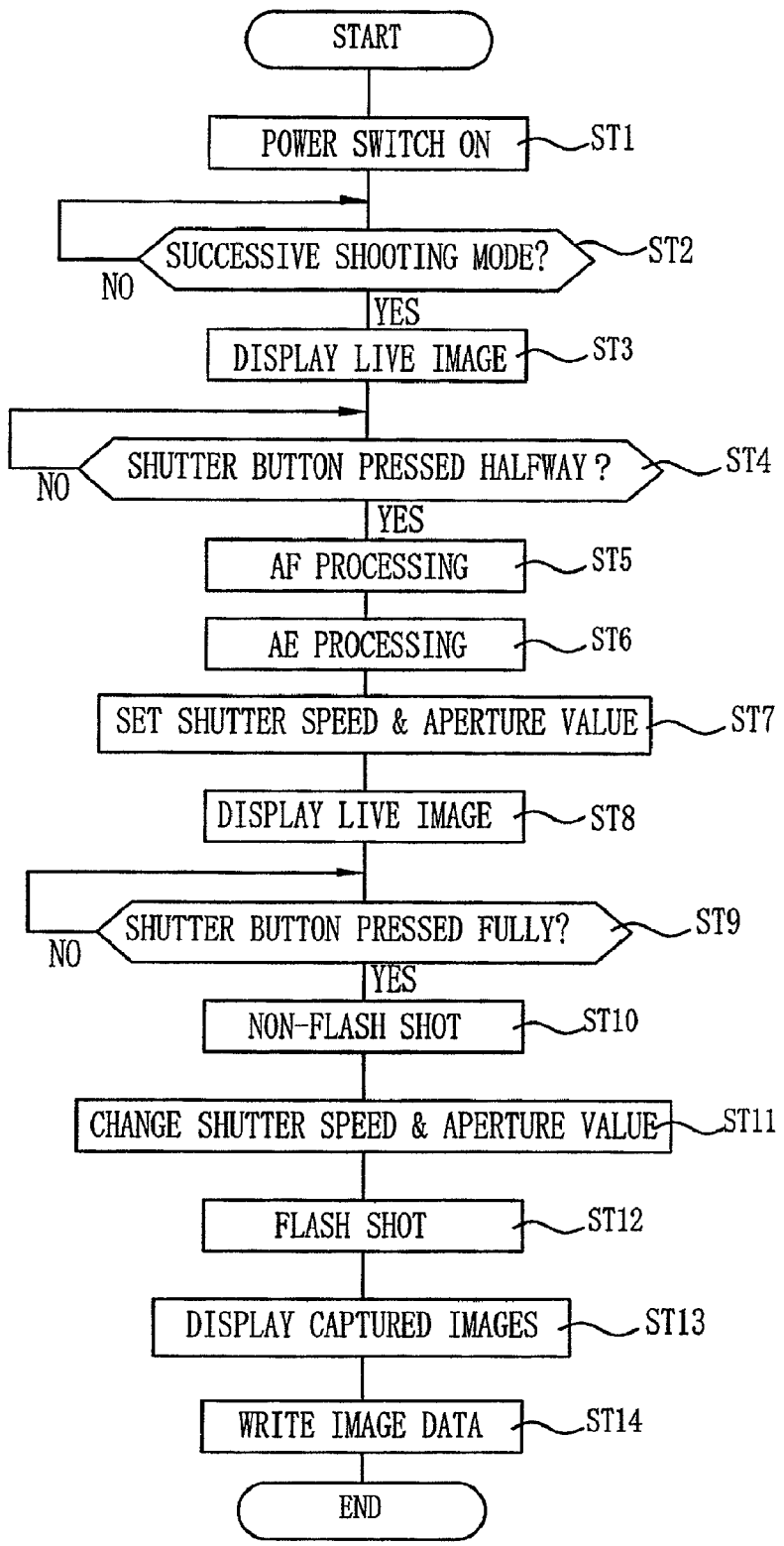
FIG. 10 is a flow chart illustrating a main sequence for operating the digital camera in the successive shooting mode, according to the second embodiment of the invention.

Now the operation in the successive shooting mode of the second embodiment will be described with reference to the flow chart of FIG. 10.

First, a power switch 17 is turned on (ST1: step 1), and the successive shooting mode is selected (ST2: step 2). Then, the live image of the subject is displayed on the LCD panel 15 (ST3: step 3). The user frames a scene while observing the live image on the LCD panel 15. When the user presses a shutter release button 16 halfway (ST4: step 4), an AF circuit 54 executes an AF processing (ST5: step 5), and an AE circuit 53 executes an AE processing (ST6: step 6). The AE circuit 53 integrates the luminance signal of the image data, and sends the integrated luminance value as a subject brightness value to a CPU 21. The CPU 21 reads the programs 71 and 72 and decides proper exposure conditions for the non-flash shot and the flash shot based on the subject brightness value. In the example shown in FIGS. 9A and 9B, the subject brightness value is 8 Ev, so the shutter speed is decided to be Tv5 (1/30 sec.), and the aperture value is decided to be Av3 (F/2.8) according to the program 71 for the non-flash shot. On setting the exposure condition according to the program 72 for the flash shot, the subject brightness value of 8 Ev is so dark that there is no corresponding combination of a shutter speed and an aperture value. Therefore, as the lightest available exposure condition, a shutter speed of Tv6 (1/60 sec.) and an aperture value of Av3 (F/2.8) are selected. Then, the CPU 21 controls a stop drive mechanism 29 to set the decided aperture value at a stop 27, and controls a timing generator 36 to provide the decided shutter speed (ST7: step 7). After confirming the live image on the LCD panel 15 (ST8: step 8), the user presses the shutter button 16 farther from the half-pressed position to the full-pressed position (ST9: step 9).

The moment the shutter button 16 is pressed to the full, the non-flash shot is made first (ST10: step 10) at the exposure condition decided according to the program 71, and the image data obtained by the non-flash shot is temporarily stored in the internal memory 43. Next, the CPU 21 changes the shutter speed and the aperture value to those values decided according to the program 72 for the flash shot (ST11: step 11). Then, the CPU 21 executes the flash shot while driving the flash device 13 to emit a predetermined amount of light. Image data obtained by the flash shot is also stored temporarily in the internal memory 43, to complete the flash shot (ST12: step 12). Then, the CPU 21 reads out the image data as captured by the non-flash shot and the flash shot from the internal memory 43, to display post-view images on the LCD panel 15 based on the captured image data (ST13: step 13). After displaying the captured images, the CPU 21 compresses the image data to reduce the data volume through a compander circuit 49, and writes the compressed image data in the memory card 51 through a media controller 50 (ST14: step 14).

Since image data of the same subject is successively captured by the non-flash shot and the flash shot under proper exposure conditions respectively, it becomes possible to capture the images of better qualities than those achieved by the first embodiment.

In the first embodiment, the non-flash shot and the flash shot are always made at the same imaging sensitivity. But the present invention is not limited to this embodiment. In a third embodiment as set forth below, the imaging sensitivity is changed depending upon the subject brightness in the successive shooting mode. The third embodiment is applicable to a digital camera that has the same structure as described in the first embodiment, so the following description will use the same reference numerals as used in the first embodiment, and will refer to merely those features essential to the third embodiment.

Figure 11A:
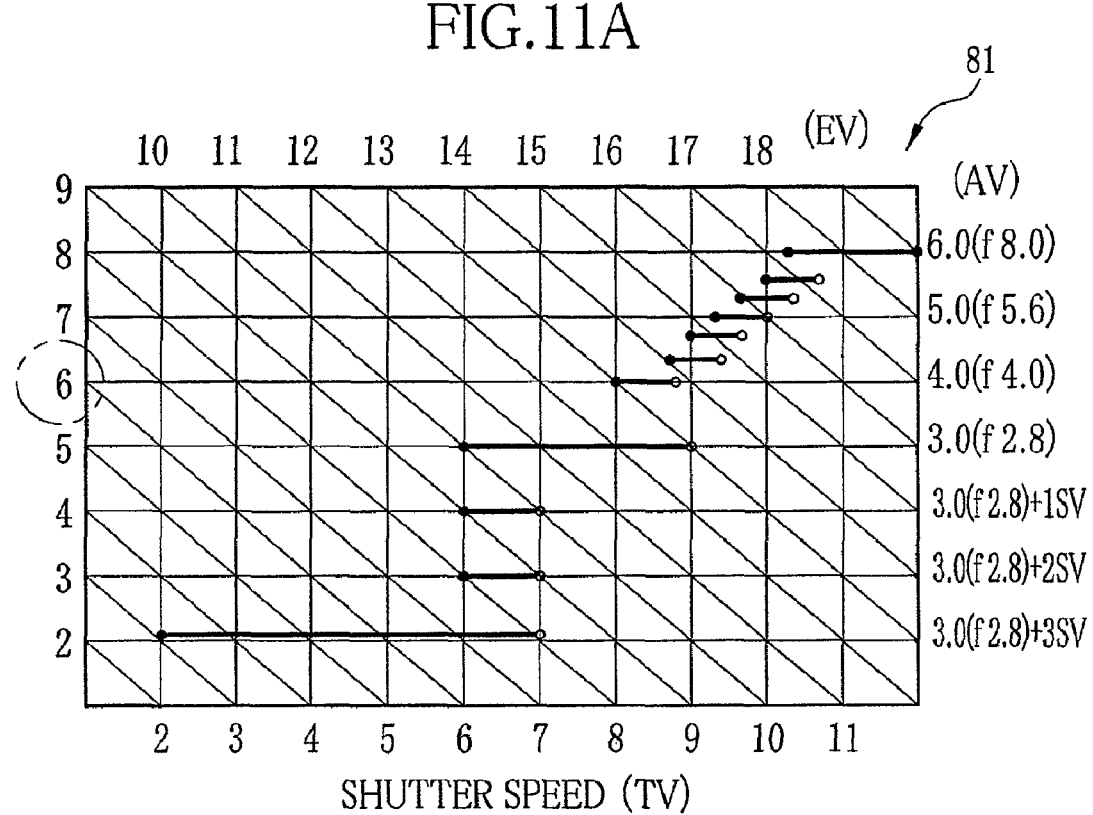
FIGS. 11A and 11B are diagrams illustrating programs for automatic exposure control for a non-flash shot and a flash shot, according to a third embodiment of the invention.
Figure 11B:
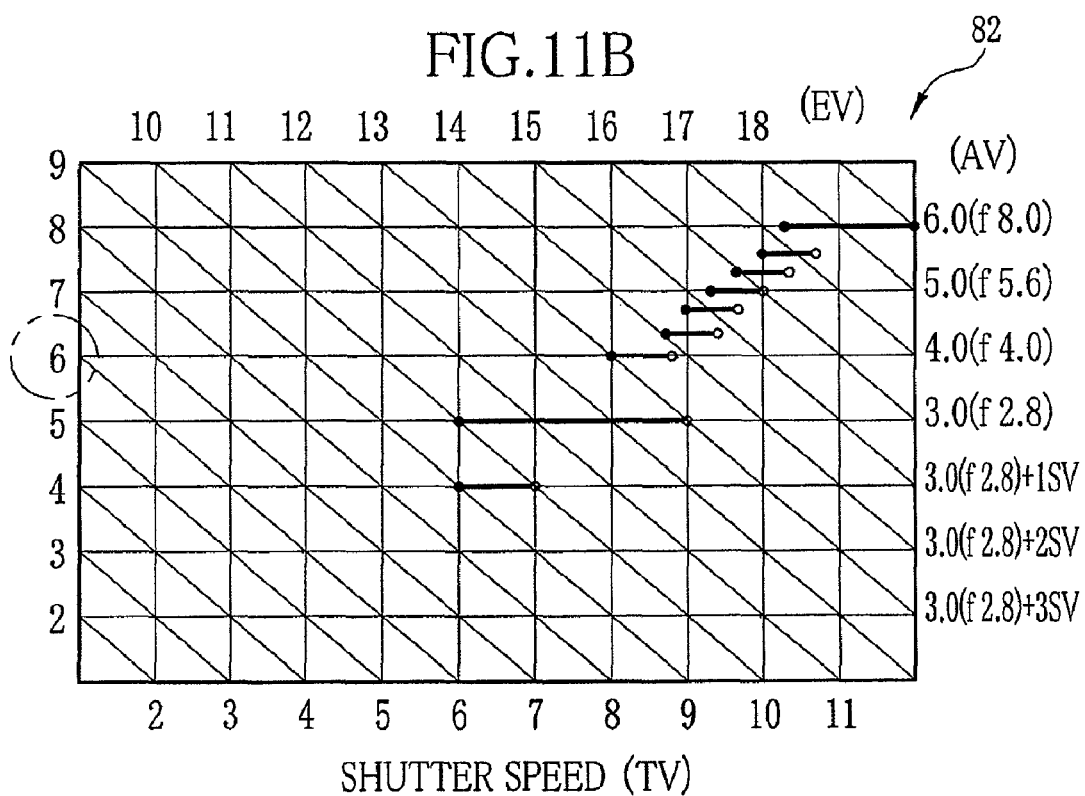

In the third embodiment, a flash memory 55 stores an automatic exposure control programs 81 and 82 for the non-flash shot and for the flash shot, as shown in FIGS. 11A and 11B. On the AE processing in the successive shooting mode, a CPU 21 reads the programs 81 and 82, to decide proper exposure conditions for the non-flash shot and the flash shot based on a subject brightness value according to the programs 81 and 82, respectively. In the third embodiment, the exposure condition is determined as a combination of a shutter speed, an aperture value and an imaging sensitivity. As implied by +Sv1, +Sv2 and +Sv3 in the programs 83 and 82, the imaging sensitivity is gradually raised as the subject brightness becomes lower.

Figure 12:
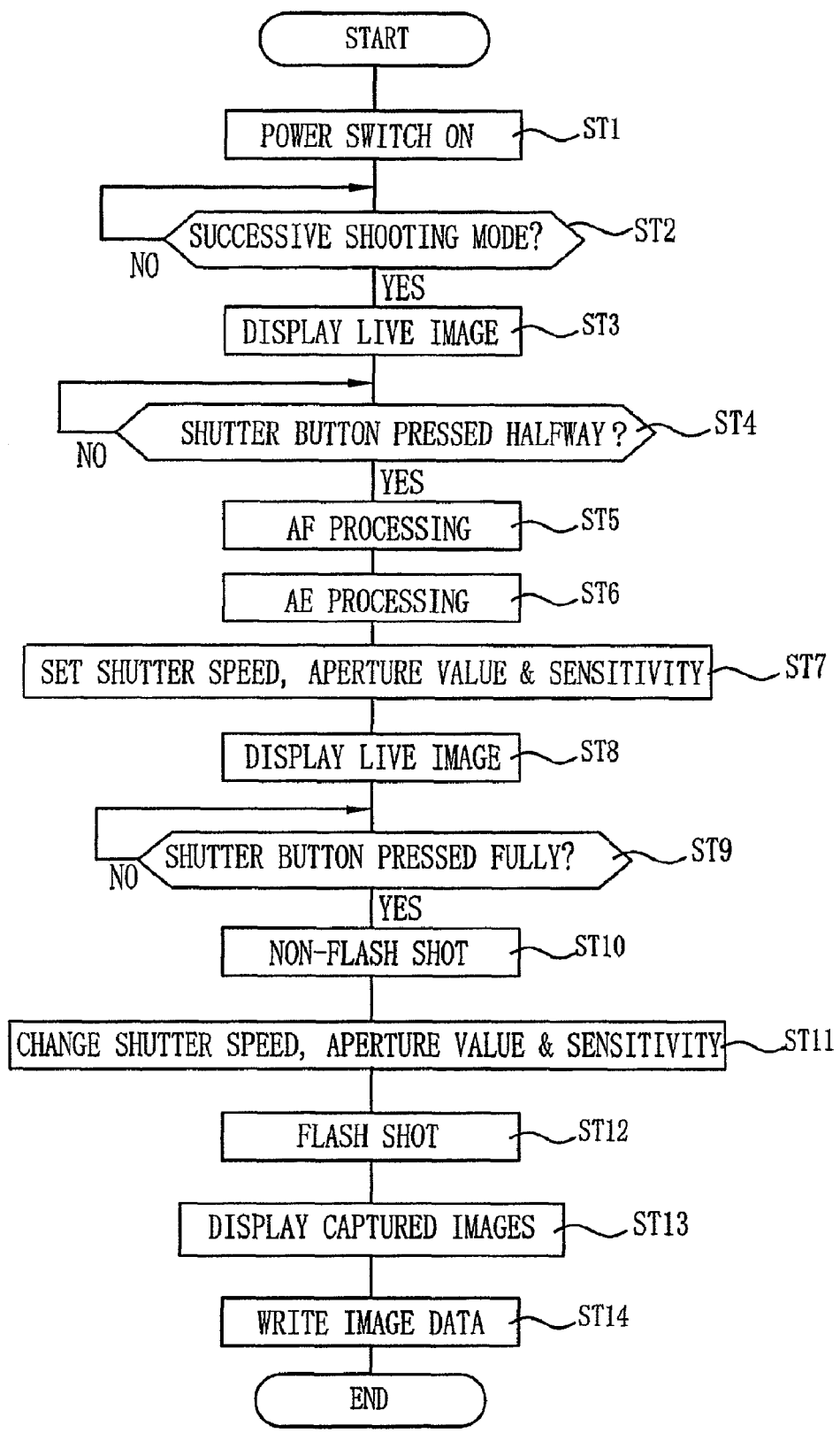
FIG. 12 is a flow chart illustrating a main sequence for operating the digital camera in the successive shooting mode, according to the third embodiment of the invention.

Now the operation in the successive shooting mode of the third embodiment will be described with reference to the flow chart of FIG. 12.

First, a power switch 17 is turned on (ST1: step 1), and the successive shooting mode is selected (ST2: step 2). Then, the live image of the subject is displayed on the LCD panel 15 (ST3: step 3), so the user frames a scene while observing the live Image on the LCD panel 15. When the user presses a shutter release button 16 halfway (ST4: step 4), an AF circuit 54 executes an AF processing (ST5: step 5), and an AE circuit 53 executes an AE processing (ST6: step 6). The AE circuit 53 integrates the luminance signal of the image data, and sends the integrated luminance value as a subject brightness value to a CPU 21. The CPU 21 reads the programs 81 and 82 and decides proper exposure conditions for the non-flash shot and the flash shot based on the subject brightness value. In the example shown in FIGS. 11A and 11B, the subject brightness value is 6 Ev, so the shutter speed is decided to be Tv5 (1/30 sec.), and the aperture value is decided to be Av3 (F/2.8) according to the program 81 for the non-flash shot. On setting the exposure condition for the flash shot according to the program 82, the subject brightness value of 6 Ev is so dark that there is no corresponding combination of a shutter speed and an aperture value. Therefore, as the lightest available exposure condition, a shutter speed of Tv6 (1/60 sec.) and an aperture value of Av3 (F/2.8) are selected, and also the imaging sensitivity Sv is raised one grade. Then, the CPU 21 controls a stop drive mechanism 29 to set the decided aperture value at a stop 27, the decided shutter speed at a timing generator 36, and the decided imaging sensitivity at a CDS circuit 37 and the amplifier 38 (ST7: step 7). After confirming the live image on the LCD panel 15 (ST8: step 8), the user presses the shutter button 16 farther from the half-pressed position to the full-pressed position (ST9: step 9).

The moment the shutter button 16 is pressed to the full, the non-flash shot is made first (ST10: step 10) at the exposure condition decided according to the program 81, and the image data obtained by the non-flash shot is temporarily stored in the internal memory 43. Next, the CPU 21 changes the shutter speed, the aperture value and the imaging sensitivity to those values decided according to the program 82 for the flash shot (ST11: step 11). Then, the CPU 21 executes the flash shot while driving the flash device 13 to emit a predetermined amount of light. Image data obtained by the flash shot is also stored temporarily in the internal memory 43, to complete the flash shot (ST12: step 12). Then, the CPU 21 reads out the image data as captured by the non-flash shot and the flash shot from the internal memory 43, to display post-view images on the LCD panel 15 based on the captured image data (ST13: step 13). After displaying the captured images, the CPU 21 compresses the image data to reduce the data volume through a compander circuit 49, and writes the compressed image data in the memory card 51 through a media controller 50 (ST14: step 14).

Since image data of the same subject is successively captured by the non-flash shot and the flash shot while changing the exposure conditions, including the imaging sensitivity, it becomes possible to capture the images of better qualities than those achieved by the first and second embodiments.

In the first embodiment, photometric sensitivity and imaging sensitivity are always maintained constant both for the non-flash shot and the flash shot. In a fourth embodiment as set forth below, the photometric sensitivity and the imaging sensitivity are changed depending upon the subject brightness in the successive shooting mode. The fourth embodiment is applicable to a digital camera that has the same structure as described in the first embodiment, so the following description will use the same reference numerals as used in the first embodiment, and will refer to merely those features essential to the third embodiment. In the fourth embodiment, a CPU 21 functions as a device that executes a judging process for deciding whether to lower the sensitivity or not.

Figure 13:
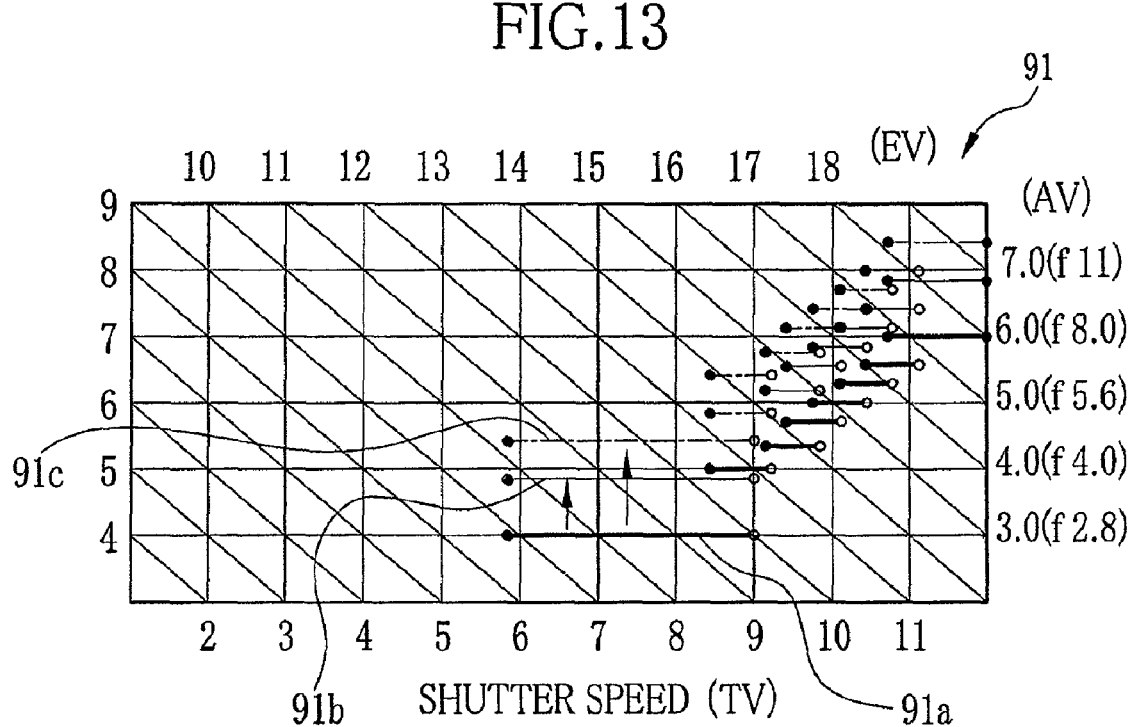
FIG. 13 is a diagram illustrating a program for automatic exposure control, according to a fourth embodiment of the invention.

In the fourth embodiment, a flash memory 55 stores an automatic exposure control program 91 for the non-flash shot and for the flash shot, as shown in FIG. 13. On the AE processing in the successive shooting mode, a CPU 21 reads the program 91, to decide proper exposure conditions for the non-flash shot and the flash shot based on a subject brightness value according to the program 91. As shown in FIG. 13, the program 91 includes three kinds of programs indicated by solid lines 91a, dashed lines 91b and chain-dotted lines 91c. The program indicated by the solid lines 91a is used to decide the exposure condition for the non-flash and flash shots while the subject brightness is in a lower range. On the other hand, the programs indicated by the dashed lines 91b and the chain-dotted lines 91c are used to decide the exposure condition while the subject brightness is in a higher range, wherein the program 91b is for the non-flash shot, and the program 91c is for the flash shot. Note that ISO sensitivity is used for setting the photometric sensitivity and the imaging sensitivity.

Figure 14:
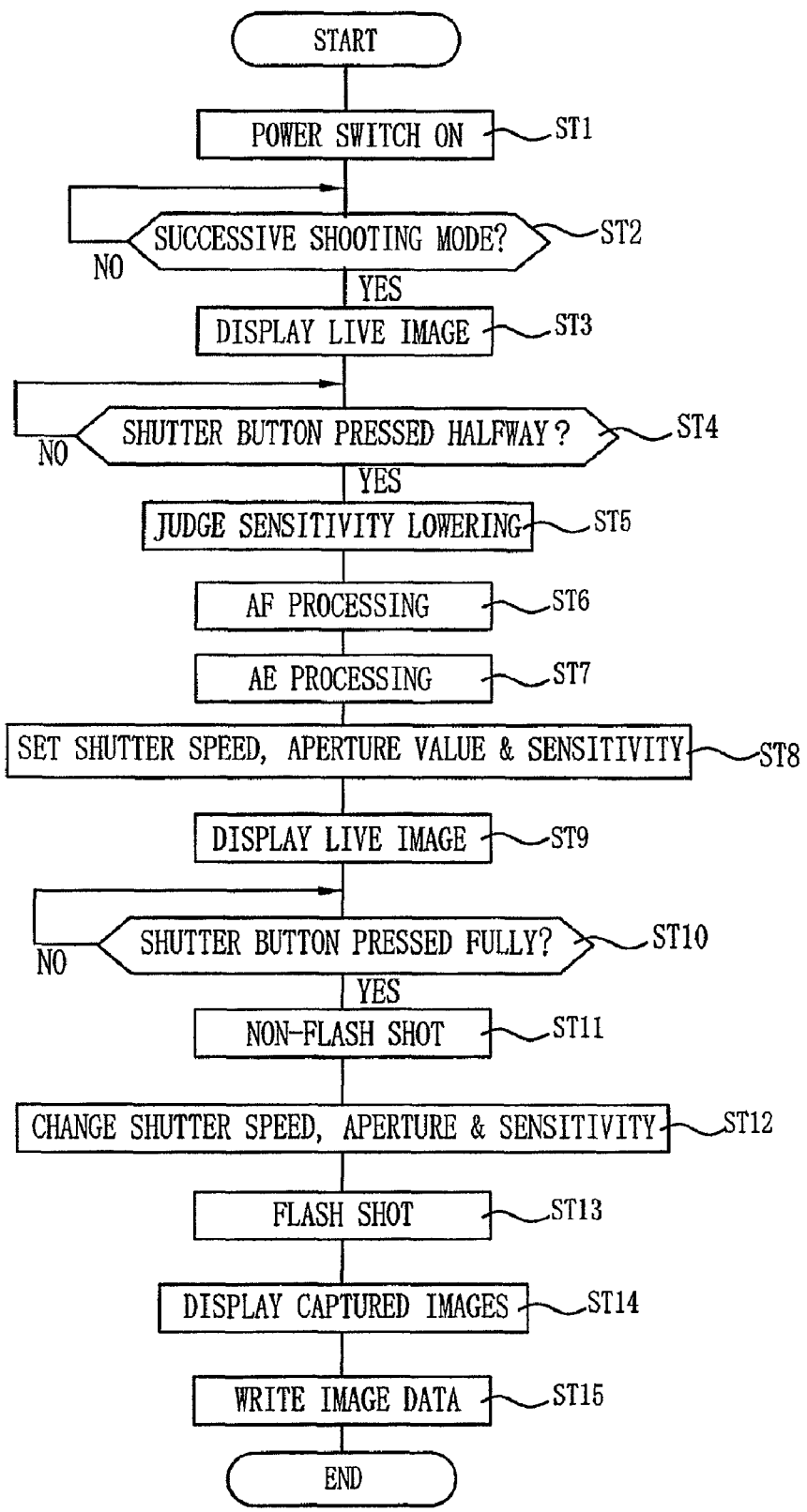
FIG. 14 is a flow chart illustrating a main sequence for operating the digital camera, according to the fourth embodiment of the invention.
Figure 15:
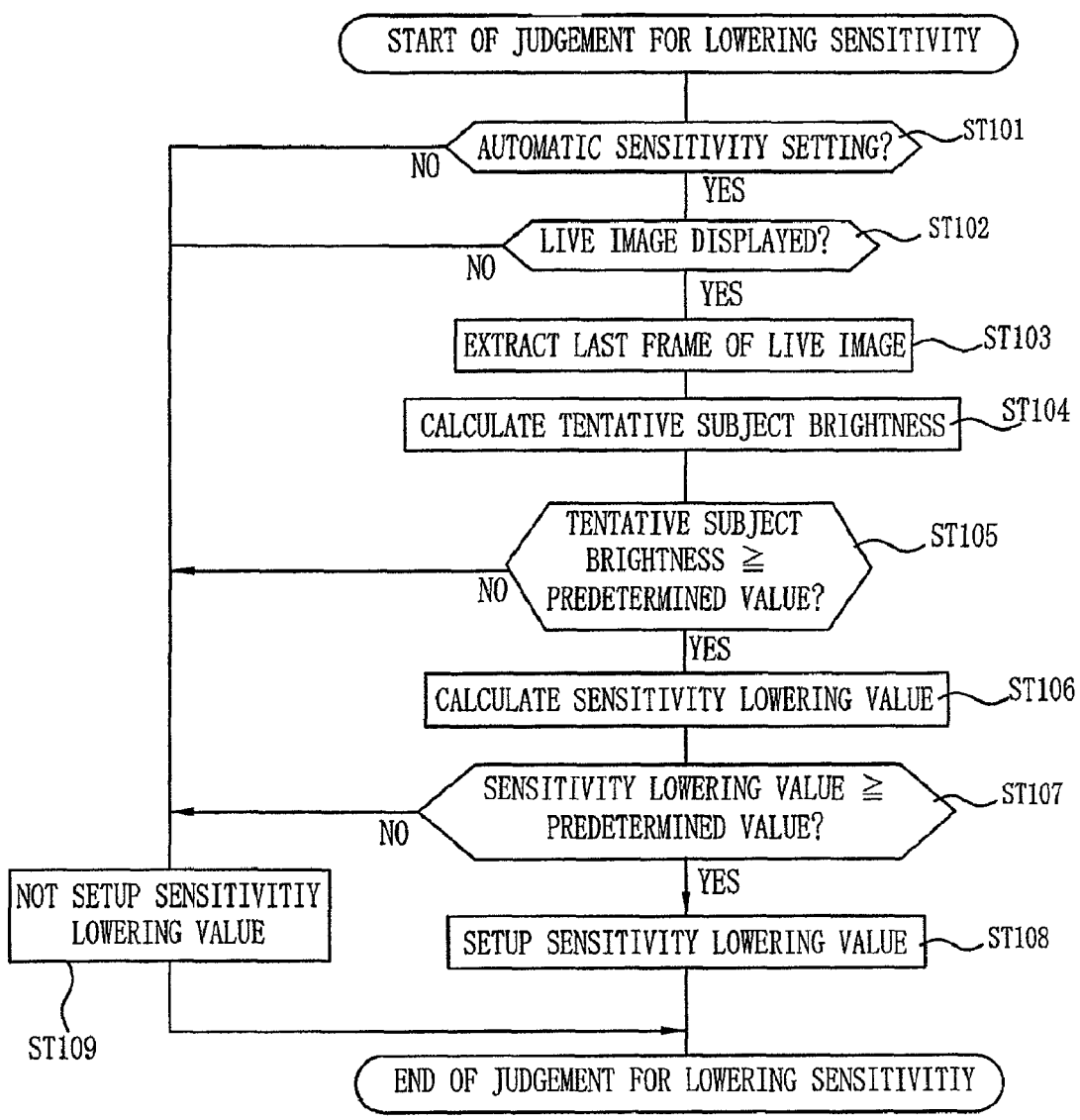
FIG. 15 is a flow chart illustrating a sub-sequence for judging whether to lower sensitivity or not, according to the fourth embodiment of the invention.

Now the operation in the successive shooting mode of the fourth embodiment will be described with reference to the flow chart of FIGS. 14 and 15.

First, a power switch 17 is turned on (ST1: step 1), and the successive shooting mode is selected (ST2: step 2). Then, the live image of the subject is displayed on the LCD panel 15 (ST3: step 3), so the user frames a scene while observing the live image on the LCD panel 15. When the user presses a shutter release button 16 halfway (ST4: step 4), the CPU 21 executes the judging process (ST5: step 5) for deciding whether to lower the sensitivity or not, as shown in FIG. 15. First, it is checked whether automatic setting of the ISO sensitivity is selected or a fixed value is selected as the ISO sensitivity (ST101: step 101). If the ISO sensitivity is fixed, the fixed value is used without lowering the sensitivity. If the automatic setting selected, the CPU 21 checks if the live image is displayed on an LCD panel 15 (ST102: step 102), and extracts the last frame of the displayed live image, to send the last frame to an AE circuit 53 (ST103: step 103). If the live image is not displayed, the judging process for lowering the sensitivity is terminated. The AE circuit 53 integrates luminance signals of the extracted frame, and sends the integrated luminance value as a tentative subject brightness value to the CPU 21 (ST104: step 104). The CPU 21 compares the tentative subject brightness value with a predetermined value (ST105: step 105). If the tentative subject brightness value is less than the predetermined value, the CPU 21 calculates a sensitivity lowering value according to the tentative subject brightness value (ST106: step 106). Then, the calculated sensitivity lowering value is compared with a second predetermined value (ST107: step 107). If the sensitivity lowering value is not less than the second predetermined value, the photometric sensitivity and the imaging sensitivity are decided to be lowered (ST108: step 108). If the sensitivity lowering value is less than the second predetermined value, the photometric sensitivity and the imaging sensitivity are kept unchanged (ST109: step 109). Thus, the judging process is concluded.

When the judging process is concluded, an AF circuit 54 executes an AF processing (ST6: step 6), and an AE circuit 53 executes an AE processing (ST7: step 7). The AE circuit 53 integrates the luminance signal of the image data, and sends the integrated luminance value as a subject brightness value to the CPU 21. If the sensitivity is decided to be lowered in the preceding judging process, the CPU 21 drives a timing generator 36, a CDS circuit 37 and an amplifier 38 so as to lower the photometric sensitivity by the decided sensitivity lowering value. Then, the CPU 21 reads the program 91 and decides proper exposure conditions for the non-flash shot and the flash shot based on the subject brightness value. At that time, if the sensitivity lowering value is not set up in the previous judgment process, the CPU 21 decides the exposure condition according to the solid lines 91a, and applies this exposure condition to both the non-flash shot and the flash shot. If, on the other hand, the sensitivity lowering value is set up in the previous judgment process, the CPU 21 controls the timing generator 36, the CDS circuit 37 and the amplifier 38 to lower the photometric sensitivity and the imaging sensitivity. At the same time, the CPU 21 switches to decide the exposure condition for the non-flash shot according to the dashed lines 91b, and the exposure condition for the flash shot according to the chain-dotted lines 91c. Then, the CPU 21 sets the exposure condition as decided according to the program 91a or the program 91b (ST8: step 8). After confirming the live image on the LCD panel 15 (ST9: step 9), the user presses the shutter button 16 farther from the half-pressed position to the full-pressed position (ST10: step 10).

The moment the shutter button 16 is pressed to the full, the non-flash shot is made first (ST11: step 11) at the exposure condition decided according to the program 91a or 91b, and the image data obtained by the non-flash shot is temporarily stored in the internal memory 43. Next, if the sensitivity lowering value is set up, the CPU 21 changes the shutter speed and the aperture value to those values decided according to the program 91c for the flash shot (ST12: step 12). If not, the same exposure condition is used for the flash shot as for the non-flash shot. Then, the CPU 21 executes the flash shot while driving the flash device 13 to emit a predetermined amount of light. Image data obtained by the flash shot is also stored temporarily in the internal memory 43, to complete the flash shot (ST13: step 13). Then, the CPU 21 reads out the image data as captured by the non-flash shot and the flash shot from the internal memory 43, to display post-view images on the LCD panel 15 based on the captured image data (ST14: step 14). After displaying the captured images, the CPU 21 compresses the image data to reduce the data volume through a compander circuit 49, and writes the compressed image data in the memory card 51 through a media controller 50 (ST15: step 15).

Since the photometric sensitivity and the imaging sensitivity are changed according to the subject brightness in the successive shooting mode, and the exposure conditions for the non-flash shot and the flash shot are decided while considering the sensitivity, it becomes possible to capture the images of better qualities than those achieved by the first or second embodiment. Note that, if the sensitivity lowering results that the exposure condition decided by photometry and calculation will make an under-exposed image even with the open-aperture, it is possible to raise the sensitivity. In that case, it is possible to change the photometric sensitivity or the imaging sensitivity between the non-flash shot and the flash shot.

Although the imaging sensitivity of the CCD 35 is changed depending upon the calculation results for setting the exposure condition in the fourth embodiment, it is alternatively possible to change the imaging sensitivity one shot after another without executing the above-described judging process or calculation. Then the time lag between the successive shots is reduced.

Now a fifth embodiment of the present invention will be described. In the fifth embodiment, if an error can occur in the successive shooting mode, a corresponding warning is given to the user before shooting. The fifth embodiment is applicable to a digital camera that has the same structure as described in the first embodiment, except that a CPU 21 functions as a device for judging whether to give a warning or not. Therefore, the same reference numerals as used in the first embodiment will be used for the same parts of the digital camera in the following description. Corresponding to a variety of errors, many kinds of warnings are prepared, e.g. a warning that notices a flash emission, a warning of hand-shake, a warning of under-exposure, and a warning of out-of-focus. The judgment for the warning is done upon a shutter release button 16 being pressed halfway, i.e. simultaneously with the AE and AT processing. For example, the hand-shake warning is given when there are large differences between frames of the live image. The under-exposure warning is given when the subject brightness is so dark that the exposure amount will be insufficient even under the lightest available exposure condition. The out-of-focus warning is given when the subject distance is beyond a focusable range of the taking lens. The CPU 21 makes judgments for these warnings.

When the CPU 21 judges that a warning should be given, the CPU 21 starts a warning display process for displaying the warning on an LCD panel 15. As shown in the flow chart of FIG. 16, the CPU 21 deletes previous data on warning (ST201) at the start of the warning display process. Next, if any warning is judged to be given with respect to the non-flash shot or the flash shot, the warning is set up to be displayed (ST202). The same process is carried out with respect to all kinds of warnings (ST203). Then, the warnings as being set up are displayed as marks 102a, 102b, 102c and 102d together with a live image 100 on the LCD panel 15, as shown for example in FIG. 17. In the example of FIG. 17, the marks 102a, 102b, 102c and 102d represent the flash emission warning, the hand-shake warning, the out-of-focus warning and the under-exposure warning, respectively. If any of these warnings should be given about the non-flash shot or the flash shot, corresponding one or more of these marks 102a to 102d are displayed commonly to the non-flash shot and the flash shot. Since it is unnecessary to display the warning marks individually about the non-flash shot and the flash shot, it takes less area for displaying the warning marks. The user can see at once from the displayed marks 102a to 102d what kinds of warnings are given about the non-flash shot and the flash shot.

The LCD panel 15 may also display a mark 103 indicating that the digital camera is in the successive shooting mode, on the same screen as the warning marks 102a to 102d. In the example shown in FIG. 17, the mark 103 consists of a mark 103a representative of the non-flash shot and a mark 103b representative of the flash shot. Beside these marks, information 104a on the exposure condition set for the non-flash shot, e.g. the aperture value, the shutter speed, and the imaging sensitivity, and information 104b on the exposure condition set for the flash shot may be displayed. Instead of or in addition to displaying the warning as marks, it is possible to give the warnings as text or voice.

Where the digital camera has a slow synchronized flash function in the standard shooting mode, i.e., the function to switch the shutter speed to a slower value than usual and emit a flash light synchronously with the slower shutter speed, it is preferable to deactivate the slow synchronized flash function in the successive shooting mode. Then, both the non-flash shot and the flash shot are made without the danger of blurring, which could otherwise occur at the slower shutter speed.

Figure 18A:
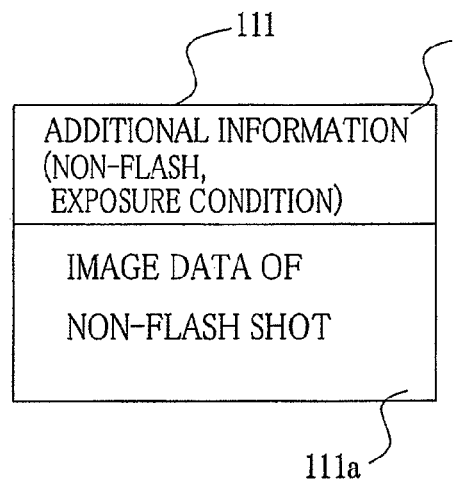
FIGS. 18A and 18B are explanatory diagrams illustrating an example of a file structure on storing image data in a memory card.
Figure 18B:
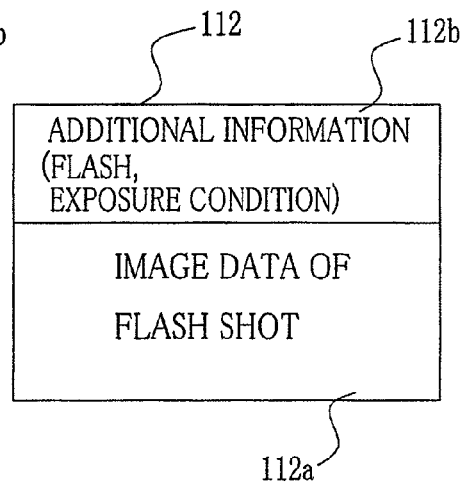

Beside the respective features of the above embodiments, the image data captured by the respective shots in the successive shooting mode is preferably stored in association with additional information, such as data discriminating between the non-flash shot and the flash shot, and data on the exposure condition, in a memory card 51. FIGS. 18A and 18B show examples of image files 111 and 112 consisting of the image data 111a and 112a captured by the non-flash shot and the flash shot, and the additional information 111b and 112b, respectively. For example, the additional information is Exif-format data, and is written in an Exif-tag zone of the image data.

Figure 19A:
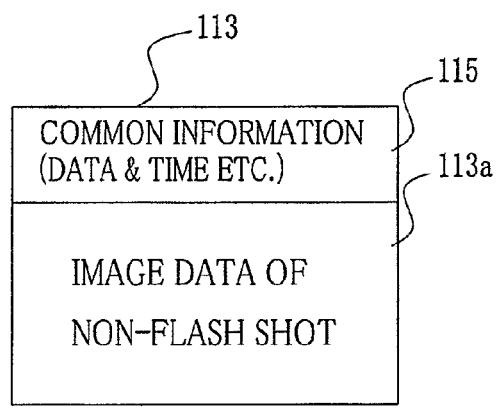
FIGS. 19A and 19B are explanatory diagrams illustrating another example of a file structure on storing image data in a memory card.
Figure 19B:
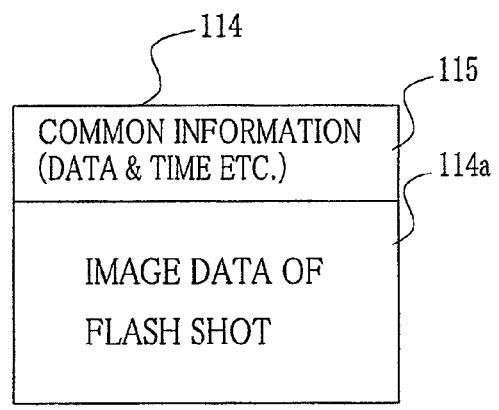

The content of the additional information is not limited to the above embodiment. For example, as shown in FIGS. 19A and 19B, common additional information 115, such as date and time of the successive shots and the like, is added to image data 113a and 114a as captured by the respective shots, to constitute image files 113 and 114 respectively. Since the image files 113 and 114 including the common additional information 115 are stored in a memory card 51, it is easy for the user to identify those image data captured successively upon one shutter release operation, when reviewing the image data stored in the memory card 51.

In the above embodiments, a non-flash shot and then a flash shot are made successively upon one shutter release operation in the successive shooting mode. However, it is possible to make the flash shot before the non-flash shot in the successive shooting mode. Then the flash light notices the user and the subject of the start of shooting. When the non-flash shot is made first, the time lag necessary for achieving a sufficient volume of flash light becomes relatively long. Making the flash shot first will therefore reduce the time lag between the first shot and the next shot. It is also possible to decide the sequence of making the non-flash shot and the flash shot depending upon the exposure conditions decided by the CPU 21. For example, one to be made at a higher shutter speed, i.e. in a shorter exposure time, is made first between the non-flash shot and the flash shot.

Furthermore, it is possible to make the non-flash shot or the flash shot more than one time upon one shutter release operation in the successive shooting mode. That is, in order to achieve the above described effects, at least a non-flash shot and at least a flash shot should be made upon one shutter release operation in the successive shooting mode, to allow comparison between two kinds of images of the same subject.

Figure 20:
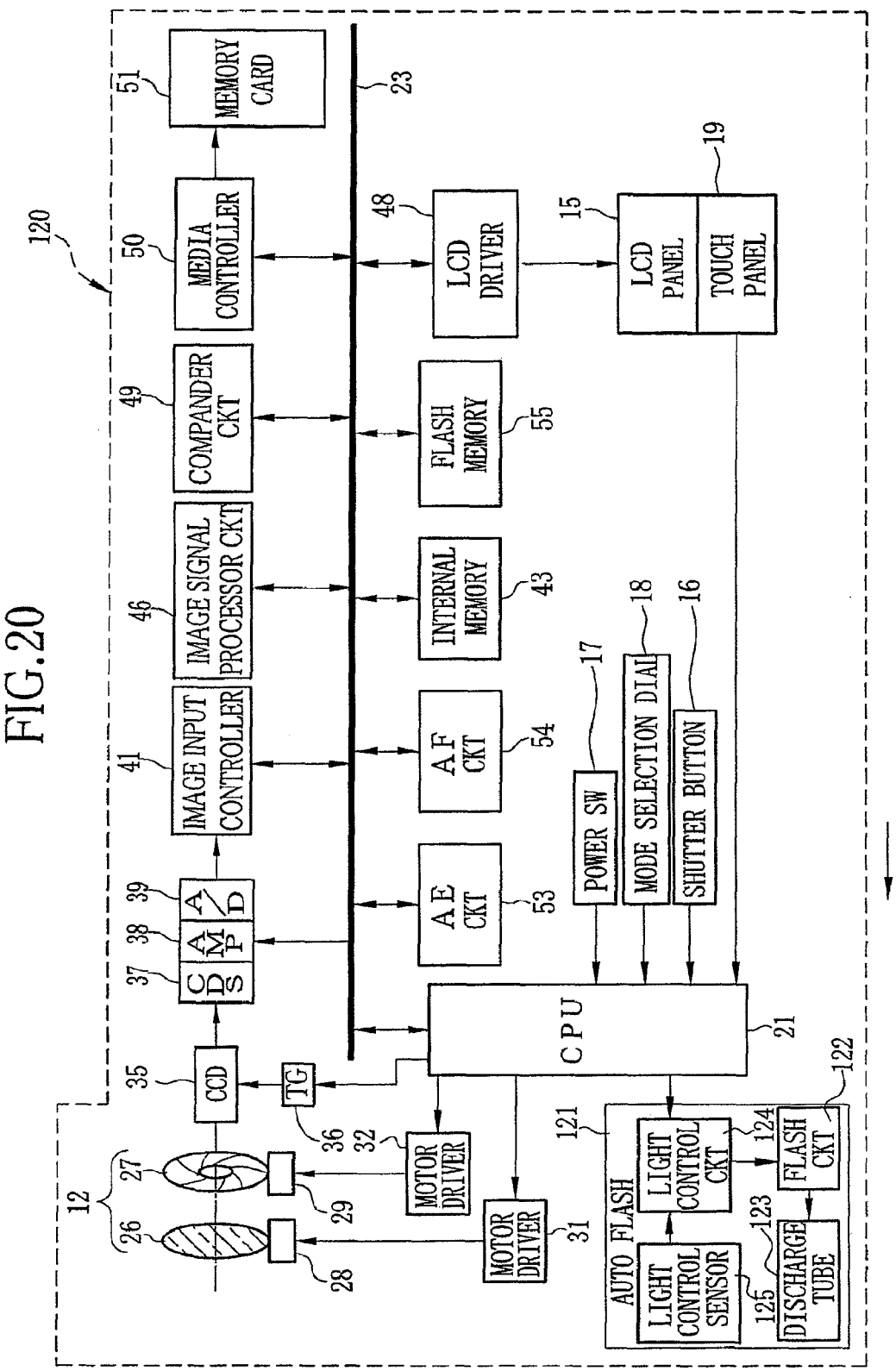
FIG. 20 is a block diagram illustrating a schematic structure of a digital camera according to a sixth embodiment of the present invention.

The present invention is also applicable to a digital camera that is provided with an automatic flash device having a function to control the volume of the flash light. FIG. 20 shows a sixth embodiment applied to a digital camera 120 provided with an automatic flash device 121 having the light volume control function. In FIG. 20, the same reference numerals designate the same parts as in the first embodiment shown in FIG. 3, so the description of these parts is omitted with respect to the sixth embodiment.

The automatic flash device 121 is constituted of a flash circuit 122, a discharge tube 123, a light control circuit 124 and a light control sensor 125. To make a flash shot, a control signal is output from a CPU 21 to the automatic flash device 121, thereby to charge a main capacitor of the flash circuit 122. Then, in synchronism with the shutter release operation, a synchronizing signal is fed to the flash circuit 122 and the light control circuit 124. Upon the synchronizing signal, the flash circuit 122 discharges the main capacitor through the discharge tube 123, so the discharge tube emits a flash of light toward the subject. The light control sensor 125 detects light reflected from the subject, to output a luminance signal corresponding to the luminance of the reflected light. When the synchronizing signal is fed and a CCD 35 starts the exposure, the light control circuit 124 receives and integrates the luminance signal with time. When the integrated value reaches a predetermined threshold value, the light control circuit 124 outputs a stop signal to the flash circuit 122. Upon receipt of the stop signal, the flash circuit 122 stops supplying electric current to the discharge tube 123, to stop the light emission.

According to the sixth embodiment, at least one non-flash shot and plural times of flash shots are successively made upon one shutter release operation in the successive shooting mode. Besides, the CPU 21 controls the imaging sensitivity of the CCD 35 to be higher for the flash shot than for the non-flash shot. With the higher imaging sensitivity, the volume of the flash light from the automatic flash device 121 can be reduced. It takes less time to charge the main capacitor up to a necessary level for emitting the flash light with the reduced volume, so the time lag between the successive flash shots is reduced.

The timing when the automatic flash device 121 starts the above-described light control is not limited to when a shutter release button is pressed halfway or to the full, but may be anytime in a period from immediately after the selection of the successive shooting mode to the end of shooting. For example, the light control may start at predetermined time intervals after the start of the successive shooting mode, or in a predetermined time after a previous shooting. The light control may also start upon an input signal entered through an operation member other than the shutter button.

According to a seventh embodiment of the present invention, a tentative shot is made before a final shot, and the light control for the flash light is executed during the tentative shot, so as to save time for the exposure control and the flash light control during the final shot. Preferably, the tentative shot is set to capture image data with a fewer number of pixels than image data captured by the final shot. Thereby, it takes less time for the tentative shots. The seventh embodiment is applicable to a digital camera that has the same structure as the digital camera 120 shown in FIG. 20, so the same reference numerals as used in the sixth embodiment will be used in the seventh embodiment, while omitting the description of the camera structure.

Figure 21:
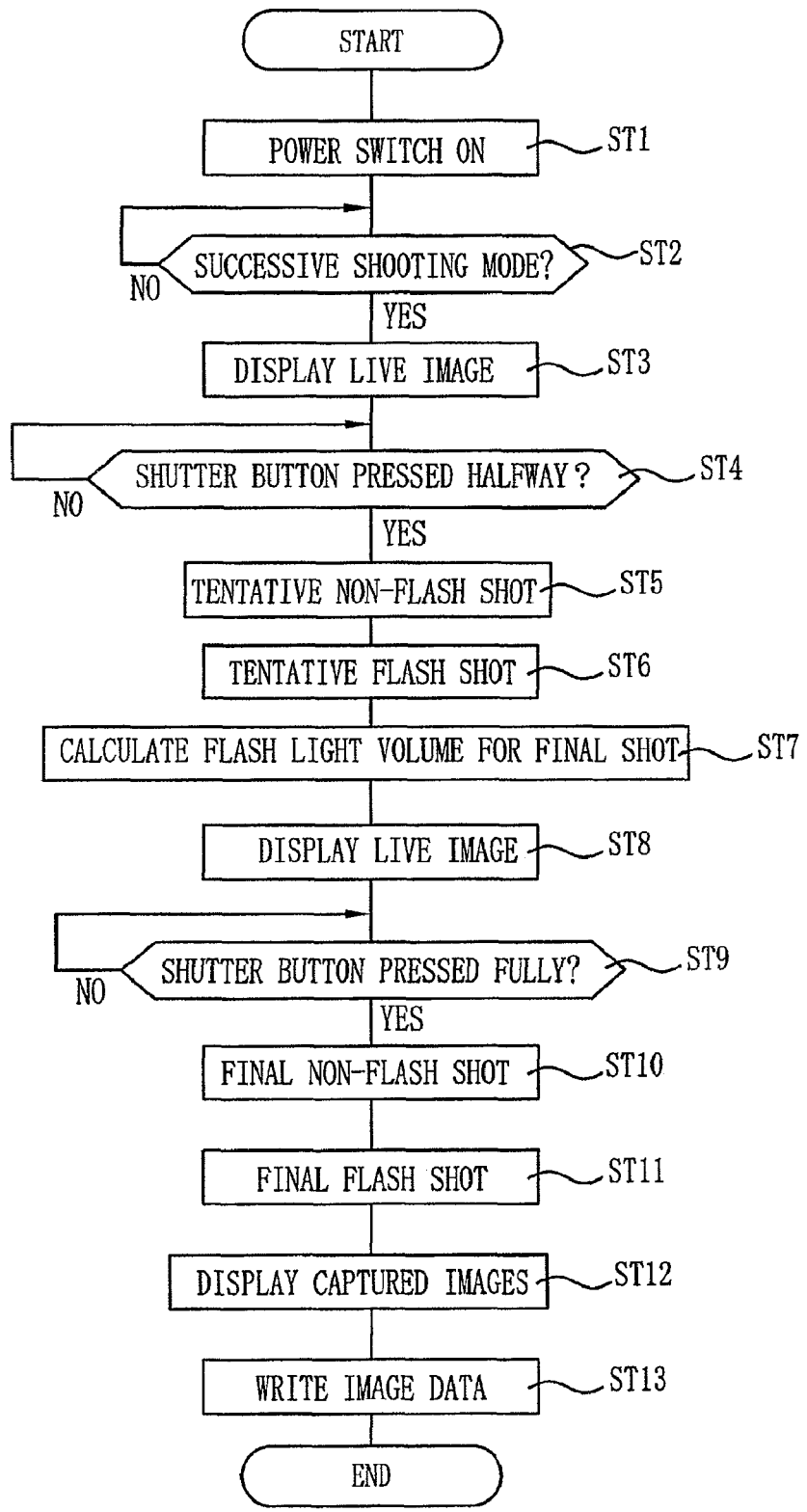
FIG. 21 is a flow chart illustrating a main sequence for operating a digital camera, according to a seventh embodiment of the invention.

The operation of the seventh embodiment will be described with reference to the flow chart of FIG. 21. First, a power switch 17 is turned on (ST1), and the successive shooting mode is selected (ST2). Then, the live image of the subject is displayed on the LCD panel 15 (ST3). When the user presses a shutter release button 16 halfway (ST4), a tentative non-flash shot and a tentative flash shot are made (ST5, ST6). Note that a flash light may be emitted immediately before these tentative shots, for the sake of preventing red-eye phenomenon.

In the tentative non-flash shot (ST5), an AF processing and an AE processing are executed without the flash light, to send a CPU 21 an integrated luminance value and data on a focusing position of a lens 26 where the highest contrast of the image is obtained. Depending upon the received data, the CPU 21 decides an exposure condition for the final non-flash shot. In the tentative flash shot (ST6), a pre-emission of a flash light is done with a volume controlled through an automatic flash device 121, and an integrated luminance value as a subject brightness value, data on a focusing position of the lens 26 where the highest contrast of the image is obtained, and a luminance value detected by a light control sensor 125, i.e. the luminance value of the reflected flash light, are sent to the CPU 21. Based on these values, the CPU 21 decides an exposure condition and a flash light volume for the final flash shot (ST7).

When the user confirms a live image (ST8) and presses the shutter button 16 to the full (ST9), the CPU 21 makes the final non-flash shot (ST10), while controlling the aperture value and the shutter speed according to the exposure condition decided during the tentative non-flash shot. In succession to this, the final flash shot is made (ST11), while the CPU 21 changes the aperture value and the shutter speed according to the exposure condition decided during the tentative flash shot, and controls the automatic flash device 121 to emit a flash light with the volume decided during the tentative flash shot. Thereafter, images captured by the final non-flash shot and the final flash shot are displayed as post-view images on an LCD panel 15 (ST12), and image data of the captured images are written in a memory card 51 (ST13). When a predetermined number of successive shots are made in this way upon one shutter release operation, a sequence of successive shooting is terminated.

Since the processing for flash light control and the calculation for exposure control are carried out during the tentative shots before the final shots, it is unnecessary to make the processing for flash light control and the like during the final shots, so the time lag between the final non-flash shot and the final flash shot is reduced. Furthermore, the pre-emission of the flash light for the tentative flash shot will make the user and the subject aware of the start of shooting.

The pre-emission of the flash light for the tentative flash shot may double as that for the red-eye reduction. Then, a sufficient time for closing the iris is provided between the flash pre-emission for the tentative flash shot and the flash emission for the final flash shot, so the effect of red-eye reduction is enhanced. Moreover, it is unnecessary to provide a specific device for emitting light for the red-eye reduction, and the requisite number of times of flash light emissions is reduced. Then, the consumption of batteries in the digital camera will be reduced.

Although the LCD panel 15 merely displays the live image before the final shots in the above embodiment, it is possible to display images captured by the tentative non-flash and flash shots as preview images on the LCD panel 15. Thereby, the user can preview how the images will be captured, in advance to the final shots. As the image data is captured with a fewer number of pixels, i.e. at a lower resolution, by the tentative shot, the preview image is displayed instantly. Then, image data is captured with a larger number of pixels, i.e. at a higher resolution, by the final shot, to obtain a high-definition image.

Figure 16:
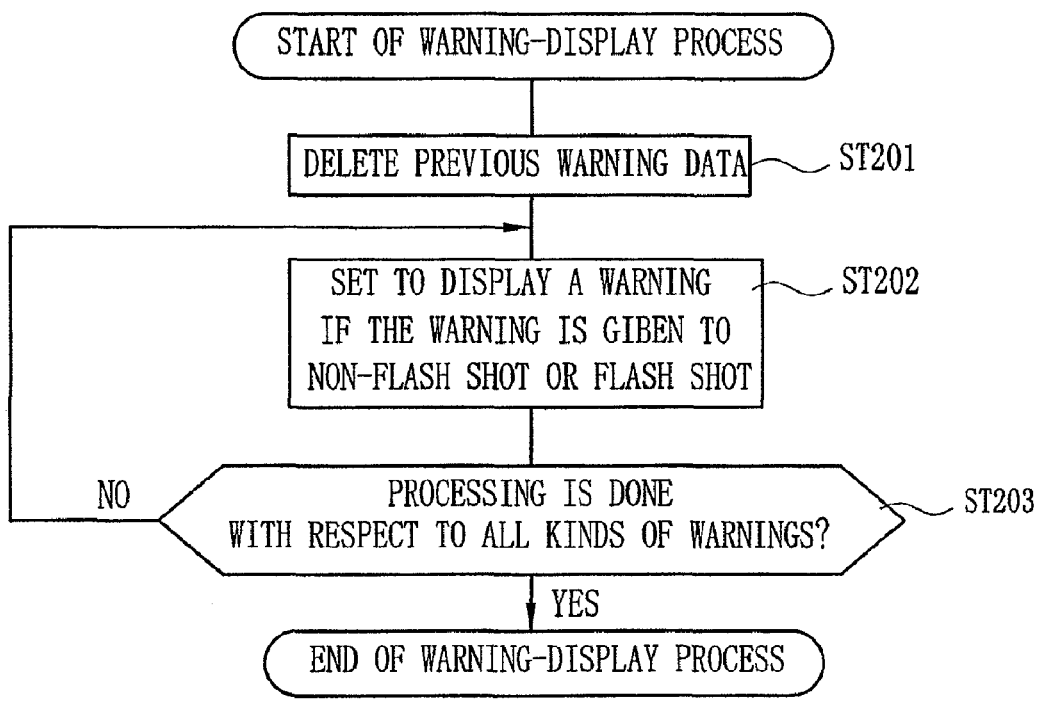
FIG. 16 is a flow chart illustrating a sequence of a warning-display process, according to a fifth embodiment of the invention.
Figure 17:
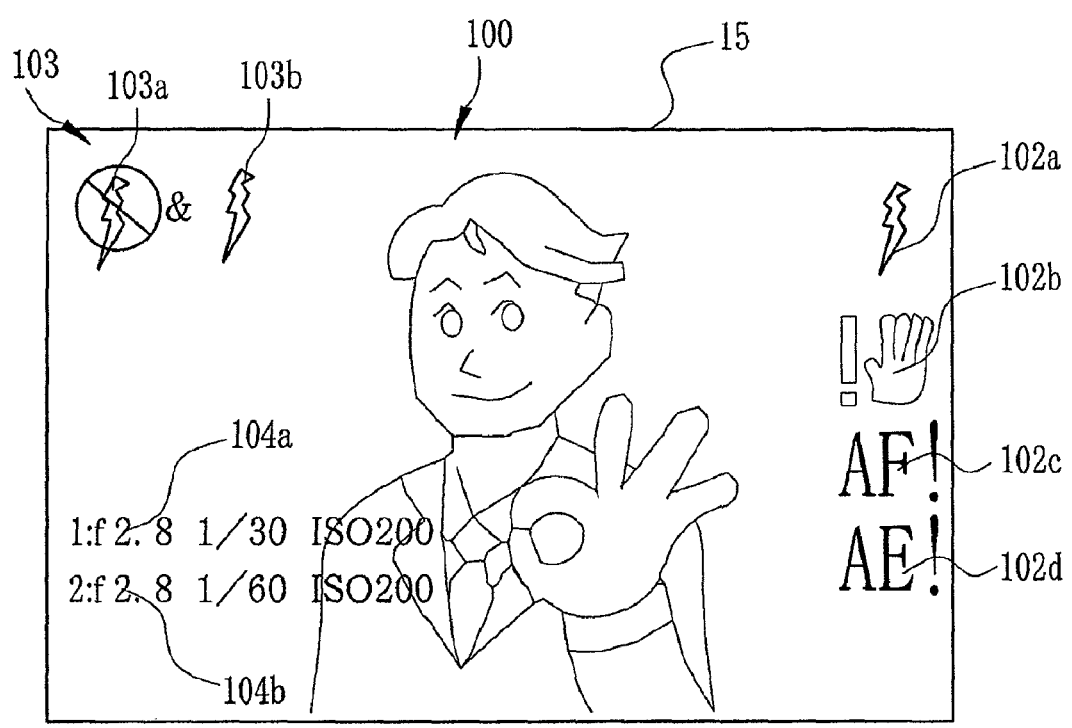
FIG. 17 is an explanatory diagram illustrating an example of a warning display screen according to the fifth embodiment of the invention.
Figure 22:
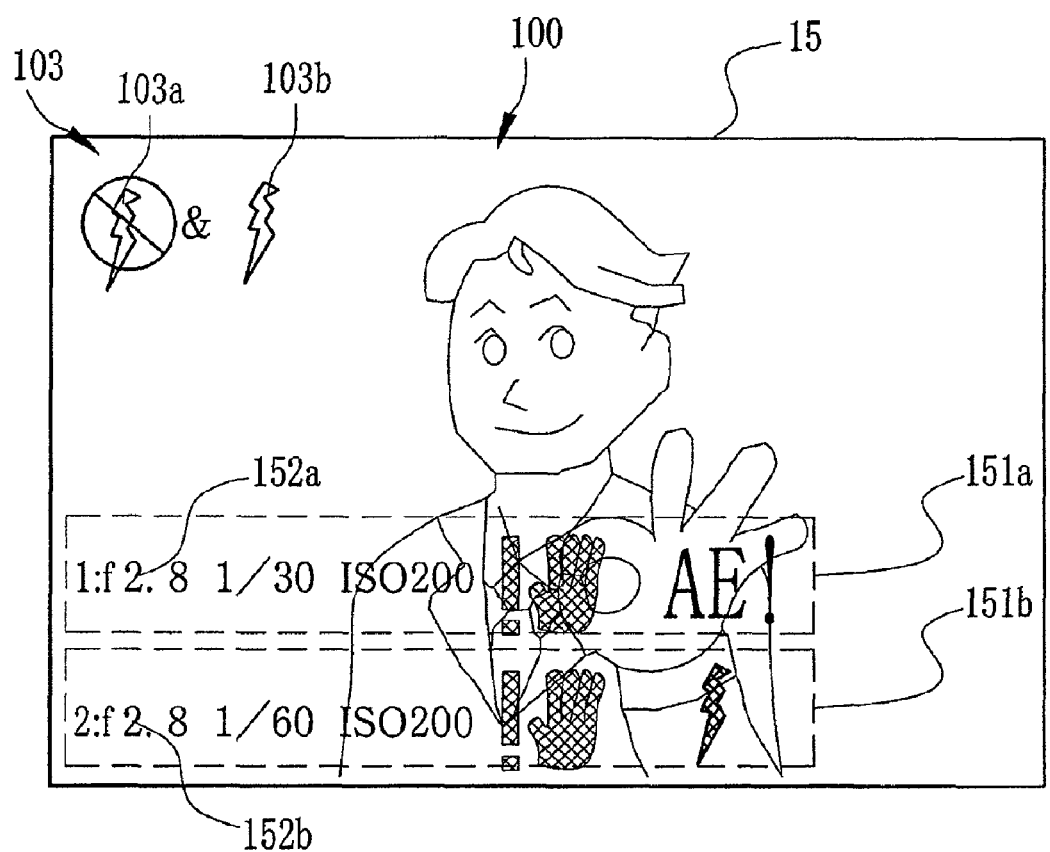
FIG. 22 is an explanatory diagram illustrating an example of a display screen for displaying exposure condition data and warning data about both of first and second shots.

In the embodiment as set forth above with reference to FIGS. 16 and 17, warning data is displayed if a warning is to be given with respect to the non-flash shot or the flash shot. But the present invention is not limited to this embodiment. It is possible to display warning data individually about each of the non-flash shot and the flash shot. For example, as shown in FIG. 22, information on the non-flash shot or a first shot may be displayed in an upper zone as bounded by a dashed line 151a, whereas information on the flash shot or a second shot may be displayed in a lower zone as bounded by a dashed line 151b. In the information zone 151a for the non-flash zone, data on an exposure condition 152a and warning marks 153a and 153b are displayed. In the information zone 151b for the flash zone, data on an exposure condition 152b and warning marks 153c and 153d are displayed. Thus, the user is noticed of the exposure condition and the warning with respect to each shot.

Figure 23:
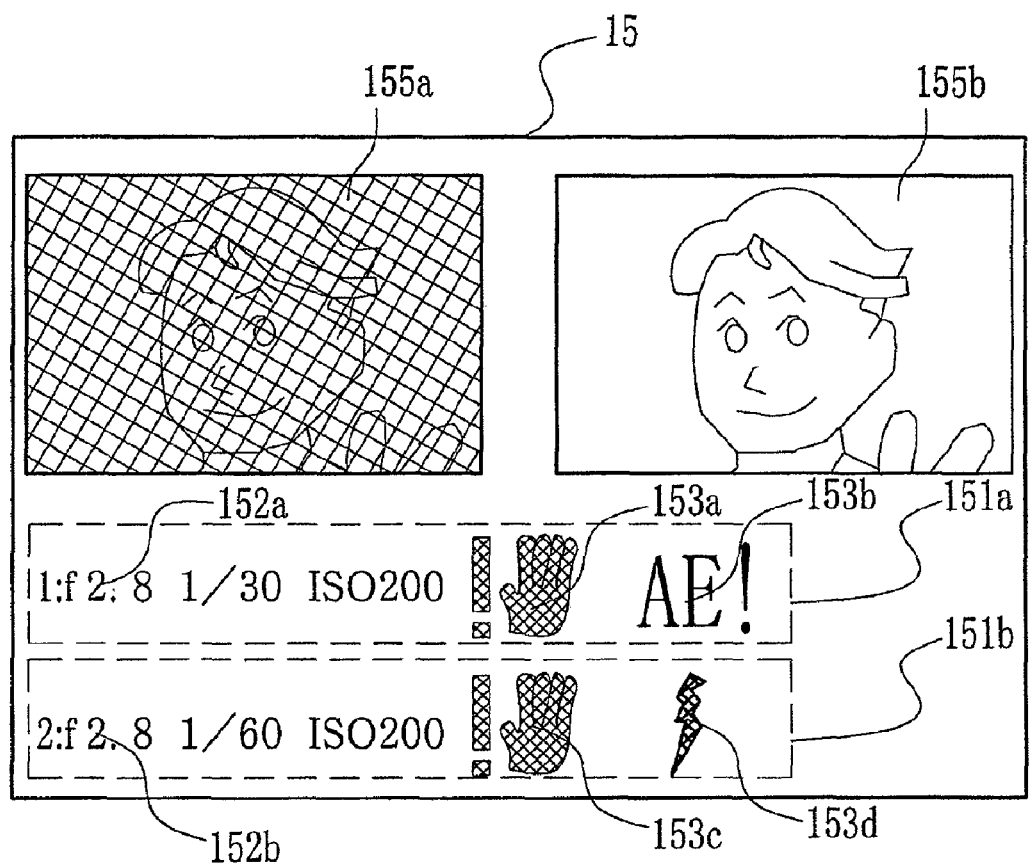
FIG. 23 is an explanatory diagram illustrating another example of a display screen for displaying exposure condition data and warning data about both of first and second shots.

Although the warning data is displayed on the same screen as the live image in the above embodiments, it is possible to display the warning data in association with each preview image which may be obtained by a tentative shot in the way as set forth above. For example, as shown in FIG. 23, a fragment of an image obtained by a first shot that may be a non-flash shot is displayed as a preview image 155a in a corner of an LCD panel 15, whereas a fragment of an image obtained by a second shot that may be a flash shot is displayed as a preview image 155b in another corner of the LCD panel 15. Beside these preview images 155a and 155b, data on exposure conditions 152a and 152b and warning marks 153a to 153d are displayed in the same way as in the embodiment shown in FIG. 22. Thereby, the user can check the information on the respective shots together with their preview images.

Figure 24:
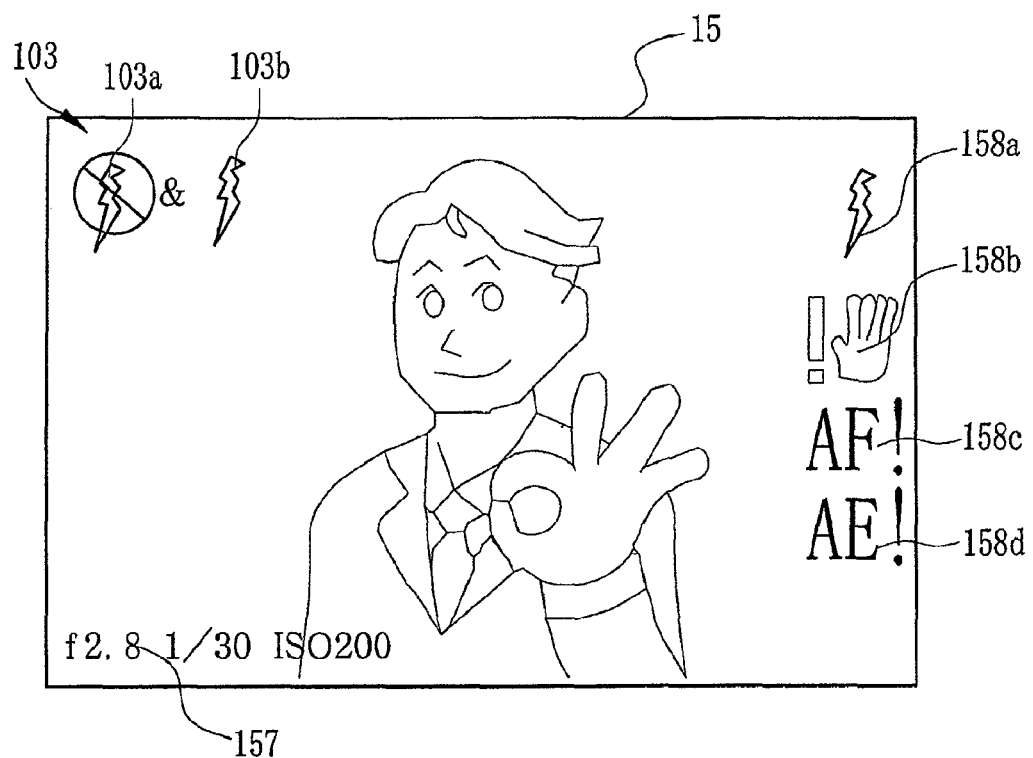
FIG. 24 is an explanatory diagram illustrating an example of a display screen where exposure condition data and warning data are displayed about only one of successive shots.

It is also possible to display the warning data and the exposure condition data with respect to a predetermined one, e.g. a first one, of a series of successive shots. This embodiment needs a small area for displaying the information, so a large area is usable for displaying the live image or the preview image. The one shot, about which the warning data and the exposure condition data is to be displayed, may not necessarily be predetermined, but may be chosen in an appropriate manner. For example, the exposure condition data and the warning data may be displayed with respect to such a shot that an exposure condition deciding device, e.g. a CPU 21, decides to make at a slower shutter speed than others. This is because the shot made at the slow shutter speed is more likely to be affected by the hand-sake or the like. Alternatively, as shown in FIG. 24, it is possible to display exposure condition data 157 about a shot that is decided to be made at a slower shutter speed, and warning marks 158a to 158d, each of which is to be given about at least one of the successive shots, like in the fifth embodiment.

Figure 25A:
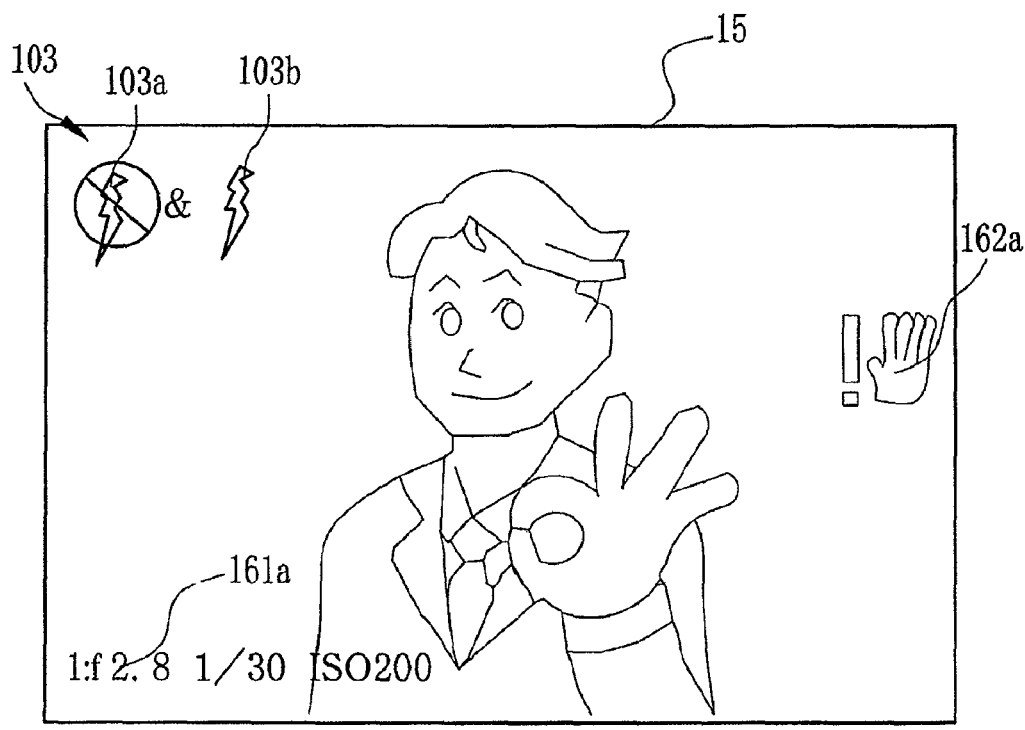
FIGS. 25A and 25B are explanatory diagrams illustrating an example of display screen which displays exposure condition data and warning data about one shot, and thereafter those on the next shot in the successive shooting mode.
Figure 25B:
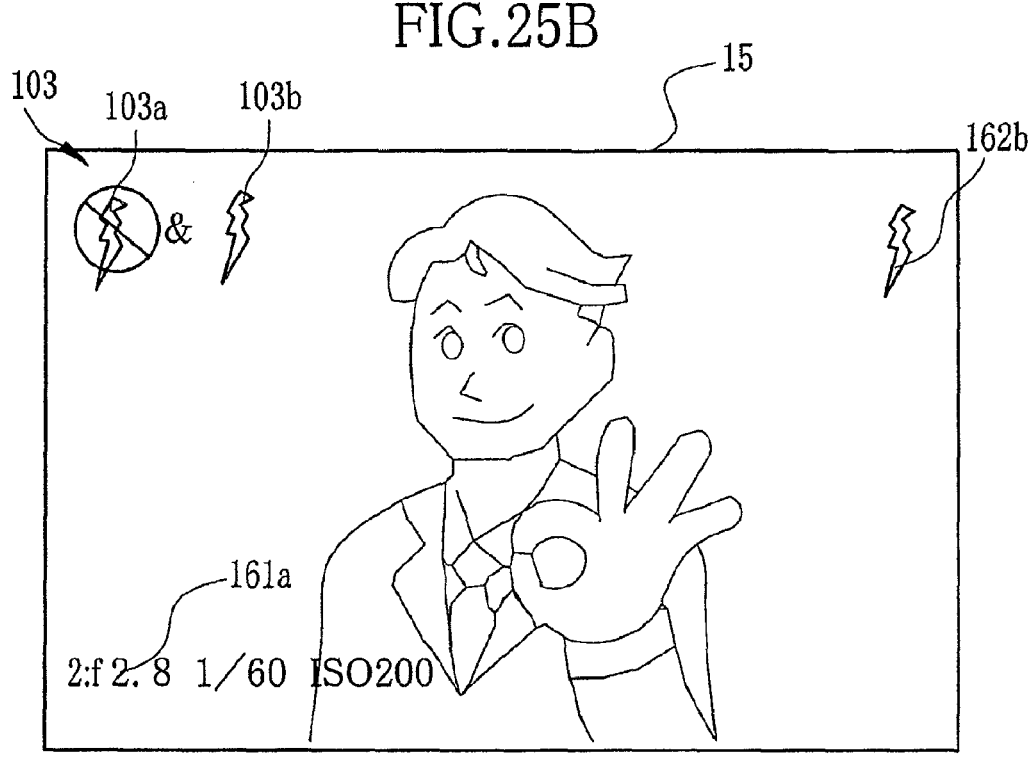

According to another embodiment shown in FIGS. 25A and 25B, exposure condition data 161a and warning data 162a on a first shot are displayed in a time period from the start of a series of successive shots to the end of the first shot, as shown in FIG. 25A, and thereafter, exposure condition data 161b and warning data 162b on a second shot are displayed immediately after the first shot, as shown in FIG. 25B. Because only information on the following shot is displayed, a small area is used for displaying the information, so a large area is usable for displaying the live image or the preview image. Where more than two shots are successively made upon a shutter release operation, exposure condition data and warning data on a third shot are displayed immediately after the second shot.

The timing of displaying the exposure condition data and the warning data is not limited to the above embodiments. For example, it is possible to display the information immediately after the first shot, after every shot, or after the last shot of one series. The exposure condition data and the warning data may also be displayed immediately after an exposure condition deciding device, such as a CPU 21, decides exposure conditions for the respective shots. Thereby, the display on the screen is simplified before the decision of the exposure conditions.

The exposure condition data and the warning data may be displayed on a separate display device, instead of an LCD panel 15 of a digital camera.

Thus, the present invention is not to be limited to the above embodiments but, on the contrary, various modifications will be possible without departing from the scope of claims appended hereto.

What is claimed is:

1. A digital camera provided with a special successive shooting mode wherein an imaging device makes a series of successive shots upon each shutter release operation, including at least a non-flash shot and at least a flash shot that is made synchronously with a flash light from a flash device, said digital camera comprising:
an exposure condition deciding device for deciding exposure condition of said imaging device through photometry and calculation, wherein said exposure condition deciding device decides individual exposure conditions for the non-flash shot and the flash shot upon a shutter button being pressed halfway in said successive shooting mode, and said imaging device starts the successive shots of one series when said shutter button is fully pressed; and
wherein said digital camera is provided with a slow synchronized flash function, whereby a flash shot is made at a slower shutter speed than usual in a standard shooting mode, and wherein said slow synchronized flash function is deactivated in said successive shooting mode.

2. A digital camera as claimed in claim 1, further comprising a light control device for controlling volume of the flash light from said flash device, said light control device being successively driven upon a predetermined operation or at predetermined timing while said imaging device is being driven successively in said successive shooting mode.

3. A digital camera as claimed in claim 2, further comprising a device for changing imaging sensitivity of said imaging device, wherein when a plural number of flash shots are successively made upon one shutter release operation in said successive shooting mode, the imaging sensitivity is raised and said light control device is activated for these flash shots.

4. A digital camera as claimed in claim 1, further comprising a device for changing imaging sensitivity of said imaging device, wherein the imaging sensitivity when under-exposure will occur under the exposure condition decided based on the present sensitivity in said successive shooting mode.

5. A digital camera as claimed in claim 1, further comprising a judging device for judging whether to lower photometric sensitivity and imaging sensitivity when a measured subject brightness value is above a predetermined value, wherein when said judging device judges to lower the photometric sensitivity and imaging sensitivity, said exposure condition deciding device carries out the photometry and calculation at the lowered photometric and imaging sensitivities to decide the exposure conditions, and said imaging device makes the successive shots at the lowered imaging sensitivity.

6. A digital camera as claimed in claim 5, wherein when said judging device judges not to lower the photometric sensitivity and imaging sensitivity, said exposure condition deciding device decides a common exposure condition to the non-flash and flash shots at a standard photometric and imaging sensitivities in said successive shooting mode.

7. A digital camera as claimed in claim 1, wherein the non-flash shot is made before the flash shot among of the successive shots of one series.

8. A digital camera as claimed in claim 1, wherein the flash shot is made before the non-flash shot among of the successive shots of one series.

9. A digital camera as claimed in claim 1, wherein a shot to be made at a higher shutter speed is made before a shot to be made at a lower shutter speed among of the successive shots of one series.

10. A digital camera as claimed in claim 1, further comprising a device for changing imaging sensitivity of said imaging device, wherein said exposure condition deciding device decides to use a higher imaging sensitivity for a preceding one of the successive shots of one series, and a lower imaging sensitivity for a succeeding one of the successive shots of one series.

11. A digital camera as claimed in claim 1, further comprising a warning device for giving warning when it is judged to be necessary to warn about one or both of the non-flash shot and the flash shot in said successive shooting mode.

12. A digital camera as claimed in claim 11, wherein said warning device totally displays data indicating the content of warnings about any of the successive shots of one series.

13. A digital camera as claimed in claim 11, wherein said warning device individually displays data indicating the content of warnings about each of the successive shots of one series.

14. A digital camera as claimed in claim 13, wherein the warning data is displayed together with data of the exposure condition for each shot.

15. A digital camera as claimed in claim 11, wherein at least one of the warning data and the exposure condition is displayed immediately after the first shot, after every shot or after the last shot of the successive shots of one series in said successive shooting mode.

16. A digital camera as claimed in claim 11, wherein at least one of the warning data and the exposure condition is displayed with respect to a preceding one of the successive shots of one series before said imaging device starts these successive shots.

17. A digital camera as claimed in claim 11, wherein at least one of the warning data and the exposure condition is displayed before said imaging device starts the successive shots of one series, with respect to one be made at the slowest shutter speed of the successive shots.

18. A digital camera as claimed in claim 1, wherein said imaging device first makes tentative non-flash and flash shots at a low resolution, and thereafter makes the successive shots at a higher resolution in said successive shooting mode.

19. A digital camera as claimed in claim 18, further comprising a display device for displaying preview images based on image data obtained by the tentative shots, and a warning device that judges on necessity of warning about the successive shots, and makes said display device to display necessary warnings simultaneously with said preview images.

20. A digital camera as claimed in claim 1, further comprising a light control device for controlling volume of the flash light from said flash device, wherein said flash device emits a first light with a first volume at said tentative flash shot in said successive shooting mode, and said light control device calculates a second light volume based on a photometric value obtained through said tentative flash shot, so said flash device emits the flash light with the second light volume at the flash shot of the successive shots.

21. A digital camera as claimed in claim 18, wherein said exposure condition deciding device decides the exposure conditions for the non-flash shot and the flash shot of the successive shots of one series, based on data obtained through said tentative non-flash and flash shots.

22. A digital camera as claimed in claim 1, further comprising a display device for displaying images based on image data obtained through said imaging device, wherein said display device displays images as captured by the successive shots of one series in said successive shooting mode.

23. A digital camera as claimed in claim 22, wherein said display device displays the images as captured by the successive shots of one series, simultaneously on a screen.

24. A digital camera as claimed in claim 22, wherein said display device displays the images as captured by the successive shots of one series, one by one on a screen.

25. A digital camera as claimed in claim 22, wherein said display device displays at least one of the captured images immediately after the successive shots of one series are made.

26. A digital camera as claimed in claim 22, wherein said display device displays at least one of the captured images, after image data obtained by the successive shots of one series are written in a storage medium.

27. A digital camera as claimed in claim 1, further comprising a display device that display data on exposure conditions of the respective successive shots of one series immediately after said exposure condition deciding device decides the exposure conditions.

28. A digital camera as claimed in claim 1, wherein additional data discriminating between the non-flash shot and the flash shot are attached to the respective image data obtained by the successive shots of one series.

29. A digital camera as claimed in claim 1, wherein common additional data is attached to the image data obtained by the same series of the successive shots.

* * * * *